(12) United States Patent
Roberson et al.

(10) Patent No.: US 10,474,853 B2
(45) Date of Patent: Nov. 12, 2019

(54) MULTI-COIL RFID SENSOR ASSEMBLY

(71) Applicant: Halliburton Energy Services, Inc., Houston, TX (US)

(72) Inventors: Mark W. Roberson, Cary, NC (US); Charles Bartee, Durham, NC (US); Krishna M. Ravi, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/554,312

(22) PCT Filed: Mar. 3, 2015

(86) PCT No.: PCT/US2015/018480
§ 371 (c)(1),
(2) Date: Aug. 29, 2017

(87) PCT Pub. No.: WO2016/140651
PCT Pub. Date: Sep. 9, 2016

(65) Prior Publication Data
US 2018/0082090 A1    Mar. 22, 2018

(51) Int. Cl.
*G06K 7/10* (2006.01)

(52) U.S. Cl.
CPC ............... *G06K 7/10366* (2013.01)

(58) Field of Classification Search
CPC .......... G06K 7/10366; G06K 7/10009; G06K 7/10356; G06K 19/0717; G06K 19/0723; E21B 47/124
USPC ...................... 235/451; 340/854.6
See application file for complete search history.

(56) References Cited

U.S. PATENT DOCUMENTS

| | | | |
|---|---|---|---|
| 4,234,344 A | 11/1980 | Tinsley et al. | |
| 5,121,795 A | 6/1992 | Ewert et al. | |
| 5,123,487 A | 6/1992 | Harris et al. | |
| 5,127,473 A | 7/1992 | Harris et al. | |
| 5,346,012 A | 9/1994 | Heathman et al. | |
| 5,588,488 A | 12/1996 | Vijn et al. | |
| 6,063,738 A | 5/2000 | Chatterji et al. | |
| 6,244,342 B1 | 6/2001 | Sullaway et al. | |
| 6,367,550 B1 | 4/2002 | Chatterji et al. | |
| 6,396,438 B1 * | 5/2002 | Seal .................... | G01S 5/10 340/8.1 |
| 6,457,524 B1 | 10/2002 | Roddy | |
| 6,547,871 B2 | 4/2003 | Chatterji et al. | |
| 6,664,215 B1 | 12/2003 | Tomlinson | |
| 6,697,738 B2 | 2/2004 | Ravi et al. | |

(Continued)

FOREIGN PATENT DOCUMENTS

WO    2011021053 A2    2/2011

OTHER PUBLICATIONS

International Search Report and Written Opinion issued in corresponding application No. PCT/US2015/018480 dated Nov. 10, 2015, 17 pgs.

(Continued)

*Primary Examiner* — Daniel A Hess
(74) *Attorney, Agent, or Firm* — Chamberlain Hrdlicka

(57) ABSTRACT

A communication assembly including at least one sensor assembly made up of interrogation circuitry and one or more antennae is described. The interrogation circuitry comprises at least one inductor comprising at least two sensing coils for reception of signals from the MEMS data sensors.

20 Claims, 18 Drawing Sheets

(56) References Cited

U.S. PATENT DOCUMENTS

| | | |
|---|---|---|
| 6,702,044 B2 | 3/2004 | Reddy et al. |
| 6,722,433 B2 | 4/2004 | Brothers et al. |
| 6,823,940 B2 | 11/2004 | Reddy et al. |
| 6,848,519 B2 | 2/2005 | Reddy et al. |
| 6,920,929 B2 | 7/2005 | Bour |
| 6,922,637 B2 | 7/2005 | Ravi et al. |
| 7,038,470 B1 | 5/2006 | Johnson |
| 7,040,404 B2 | 5/2006 | Brothers et al. |
| 7,044,222 B2 | 5/2006 | Tomlinson |
| 7,066,284 B2 | 6/2006 | Wylie et al. |
| 7,077,203 B1 | 7/2006 | Roddy et al. |
| 7,133,778 B2 | 11/2006 | Ravi et al. |
| 7,174,962 B1 | 2/2007 | Roddy et al. |
| 2002/0109636 A1* | 8/2002 | Johnson .................... H01Q 1/22 343/742 |
| 2004/0167248 A1 | 8/2004 | Brothers et al. |
| 2005/0241855 A1 | 11/2005 | Wylie et al. |
| 2007/0285275 A1* | 12/2007 | Purkis .................... E21B 34/14 340/854.6 |
| 2008/0316049 A1* | 12/2008 | Verret .................... E21B 47/10 340/854.6 |
| 2011/0111695 A1 | 5/2011 | Shameli et al. |
| 2011/0155368 A1 | 6/2011 | El-Khazindar |
| 2011/0191028 A1 | 8/2011 | Ross et al. |
| 2014/0166266 A1 | 6/2014 | Read |
| 2014/0182848 A1 | 7/2014 | Roberson et al. |

OTHER PUBLICATIONS

K. Ravi and H. Xenakis, "Cementing Process Optimized to Achieve Zonal Isolation," presented at PETROTECH-2007 Conference, New Delhi, India.

Ong, Zeng and Grimes. "A Wireless, Passive Carbon Nanotube-based Gas Sensor," IEEE Sensors Journal, 2, 2, (2002) 82-88.

Ong, Grimes, Robbins and Singl, "Design and application of a wireless, passive, resonant-circuit environmental monitoring sensor," Sensors and Actuators A, 93 (2001) 33-43.

\* cited by examiner

US 10,474,853 B2

MULTI-COIL RFID SENSOR ASSEMBLY

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many cements and are critical factors in the most prevalent deteriorative processes, including damage due to freezing and thawing, alkali-aggregate reaction, sulfate attack and delayed Ettringite (hexacalcium aluminate trisulfate) formation. Thus, it can be desirable to measure one or more sealant parameters (e.g., moisture content, temperature, pH and ion concentration) in order to monitor sealant integrity.

Active, embeddable sensors can involve drawbacks that make them undesirable for use in a well bore environment. For example, low-powered (e.g., nanowatt) electronic moisture sensors are available, but have inherent limitations when embedded within cement. The highly alkali environment can damage their electronics, and they are sensitive to electromagnetic noise. Additionally, power must be provided from an internal battery to activate the sensor and transmit data, which increases sensor size and decreases useful life of the sensor. Accordingly, an ongoing need exists for improved methods of monitoring wellbore sealant condition from placement through the service lifetime of the sealant.

Likewise, in performing wellbore servicing operations, an ongoing need exists for improvements related to monitoring and/or detecting a condition and/or location of a wellbore, formation, wellbore servicing tool, wellbore servicing fluid, or combinations thereof. Additionally, the usefulness of such monitoring is greatly improved through measurements in azimuthally defined regions of the annulus.

Such needs may be met by the systems and methods for use of RFID tags, in some cases with MEMS sensors, down hole in accordance with the various embodiments described herein.

DESCRIPTION

Figure 1:
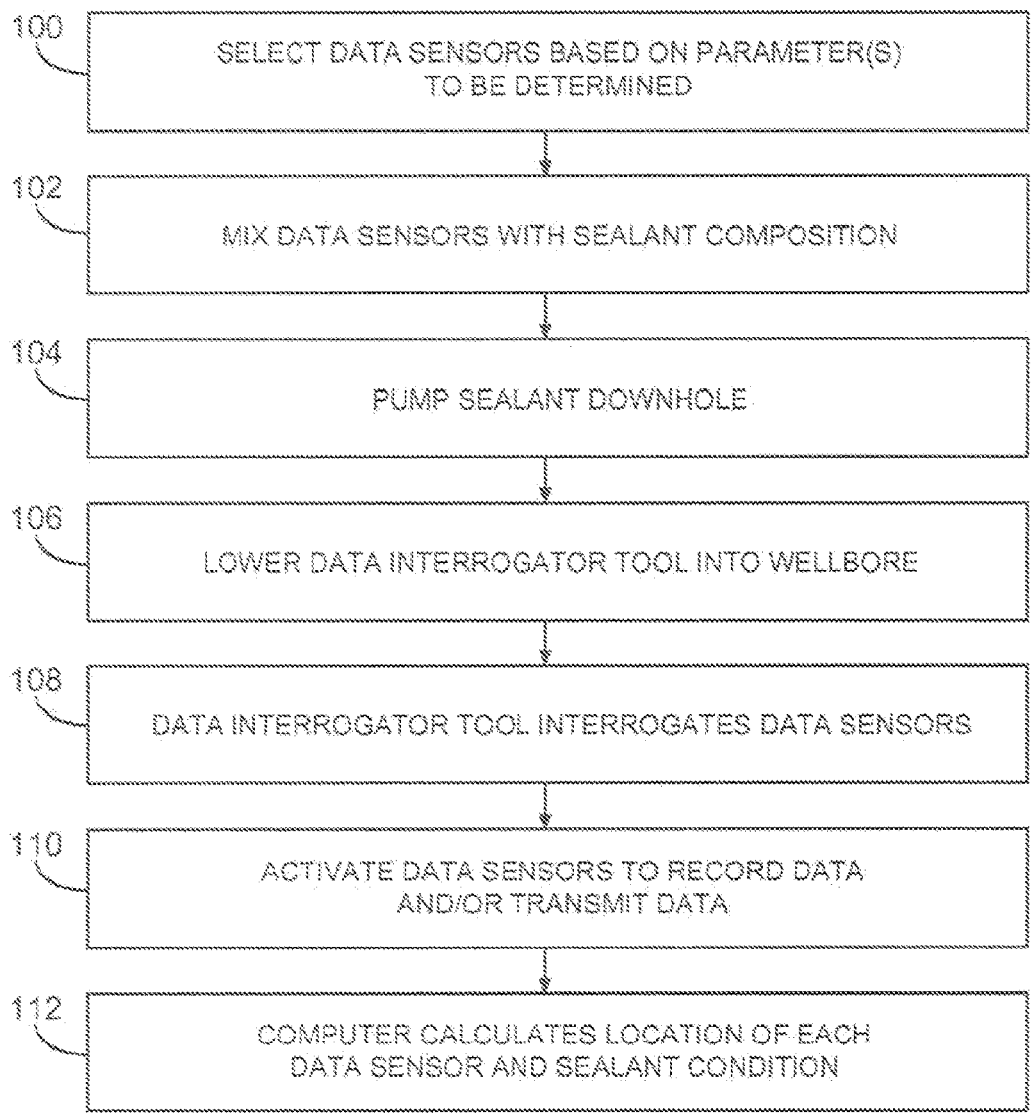
FIG. 1 is a flow chart illustrating a method in accordance with some embodiments.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function, unless specifically stated. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Communication assemblies are deployed in a borehole for a well, such as an oil well or other hydrocarbon recovery well. The communication assemblies are coupled to a casing string (e.g., the exterior of the casing), and may detect RFID tags or other properties of material (e.g., fluids) in an annulus surrounding the casing string. A communication assembly may include one or more RFID sensor assembly(s) each having at least one multi-coil sensor improving the detection quality of RFID tags in one or more azimuthally oriented or longitudinally oriented regions of the annulus surrounding the casing.

This disclosure relates to the field of drilling, completing, servicing, and treating a subterranean well, such as a hydrocarbon recovery well. In particular, the present disclosure relates to systems and methods for detecting and/or monitoring the position and/or condition of wellbore compositions, for example wellbore sealants such as cement, using RFID tags (in some cases including micro-electrical mechanical system (MEMS)-based data sensors). In some embodiments, the present disclosure describes an interrogation circuit that includes multiple coils to improve or expand the azimuthal or longitudinal coverage of the sensor assembly and a method for using the multi-coil sensor circuit to monitor RFID tags and embeddable data sensors capable of detecting parameters in a wellbore composition. The multitude of coils may be driven individually or may be driven with a single circuit.

Disclosed herein are methods and products for detecting and/or monitoring the position and/or condition of a wellbore, a formation, a wellbore service tool, and/or wellbore compositions, for example wellbore sealants such as cement, using MEMS-based data sensors. Still more particularly, the present disclosure describes methods of monitoring the integrity and performance of wellbore compositions over the life of the well using MEMS-based data sensors. Performance may be indicated by changes, for example, in various parameters, including, but not limited to, moisture content, temperature, pH, and various ion concentrations (e.g., sodium, chloride, and potassium ions) of the cement. In embodiments, the methods comprise the use of embeddable data sensors capable of detecting parameters in a wellbore composition, for example a sealant such as cement. In embodiments, the methods provide for evaluation of sealant during mixing, placement, and/or curing of the sealant within the wellbore. In another embodiment, the method is used for sealant evaluation from placement and curing throughout its useful service life, and where applicable to a period of deterioration and repair. In embodiments, the methods of this disclosure may be used to prolong the service life of the sealant, lower costs, and enhance creation of improved methods of remediation. Additionally, methods are disclosed for determining the location of sealant within a wellbore, such as for determining the location of a cement slurry during primary cementing of a wellbore as discussed further herein. Additional embodiments and methods for employing MEMS-based data sensors in a wellbore are described herein.

The methods and products disclosed herein comprise the use of various wellbore compositions, including sealants and other wellbore servicing fluids. As used herein, "wellbore composition" includes any composition that may be prepared or otherwise provided at the surface and placed down the wellbore, typically by pumping. As used herein, a "sealant" refers to a fluid used to secure components within a wellbore or to plug or seal a void space within the wellbore. Sealants, and in particular cement slurries and non-cementitious compositions, are used as wellbore compositions in several embodiments described herein, and it is to be understood that the methods and products described herein are applicable for use with other wellbore compositions. As used herein, "servicing fluid" refers to a fluid used to drill, complete, work over, fracture, repair, treat, or in any way prepare or service a wellbore for the recovery of materials residing in a subterranean formation penetrated by the wellbore. Examples of servicing fluids include, but are not limited to, cement slurries, non-cementitious sealants, drilling fluids or muds, spacer fluids, fracturing fluids or completion fluids, all of which are well known in the art. While fluid is generally understood to encompass material in a pumpable state, reference to a wellbore servicing fluid that is settable or curable (e.g., a sealant such as cement) includes, unless otherwise noted, the fluid in a pumpable and/or set state, as would be understood in the context of a given wellbore servicing operation. Generally, wellbore servicing fluid and wellbore composition may be used interchangeably unless otherwise noted. The servicing fluid is for use in a wellbore that penetrates a subterranean formation. It is to be understood that "subterranean formation" encompasses both areas below exposed earth and areas below earth covered by water such as ocean or fresh water. The wellbore may be a substantially vertical wellbore and/or may contain one or more lateral wellbores, for example as produced via directional drilling. As used herein, components are referred to as being "integrated" if they are formed on a common support structure placed in packaging of relatively small size, or otherwise assembled in close proximity to one another.

Discussion of an embodiment of the method of the present disclosure will now be made with reference to the flowchart of FIG. 1, which includes methods of placing MEMS sensors in a wellbore and gathering data. At block 100, data sensors are selected based on the parameter(s) or other conditions to be determined or sensed within the wellbore. At block 102, a quantity of data sensors is mixed with a wellbore composition, for example a sealant slurry. In embodiments, data sensors are added to a sealant by any methods known to those of skill in the art. For example, the sensors may be mixed with a dry material, mixed with one more liquid components (e.g., water or a non-aqueous fluid), or combinations thereof. The mixing may occur onsite, for example addition of the sensors into a bulk mixer such as a cement slurry mixer. The sensors may be added directly to the mixer, may be added to one or more component streams and subsequently fed to the mixer, may be added downstream of the mixer, or combinations thereof. In embodiments, data sensors are added after a blending unit and slurry pump, for example, through a lateral by-pass. The sensors may be metered in and mixed at the well site, or may be pre-mixed into the composition (or one or more components thereof) and subsequently transported to the well site. For example, the sensors may be dry mixed with dry cement and transported to the well site where a cement slurry is formed comprising the sensors. Alternatively or additionally, the sensors may be pre-mixed with one or more liquid components (e.g., mix water) and transported to the well site where a cement slurry is formed comprising the sensors. The properties of the wellbore composition or components thereof may be such that the sensors distributed or dispersed therein do not substantially settle during transport or placement.

The wellbore composition, e.g., sealant slurry, is then pumped downhole at block 104, whereby the sensors are positioned within the wellbore. For example, the sensors may extend along all or a portion of the length of the wellbore adjacent the casing. The sealant slurry may be placed downhole as part of a primary cementing, secondary cementing, or other sealant operation as described in more detail herein. At block 106, a data interrogation tool (also referred to as a data interrogator tool, data interrogator, interrogator, interrogation/communication tool or unit, or the like) is positioned in an operable location to gather data from the sensors, for example lowered or otherwise placed within the wellbore proximate the sensors. In various embodiments, one or more data interrogators may be placed downhole (e.g., in a wellbore) prior to, concurrent with, and/or subsequent to placement in the wellbore of a wellbore composition comprising MEMS sensors. At block 108, the data interrogation tool interrogates the data sensors (e.g., by sending out an RF signal) while the data interrogation tool traverses all or a portion of the wellbore containing the sensors. The data sensors are activated to record and/or transmit data at block 110 via the signal from the data interrogation tool. At block 112, the data interrogation tool communicates the data to one or more computer components (e.g., memory and/or microprocessor) that may be located within the tool, at the surface, or both. The data may be used locally or remotely from the tool to calculate the location of each data sensor and correlate the measured parameter(s) to such locations to evaluate sealant performance. The data interrogation tool can comprise MEMS sensor interrogation functionality, communication functionality (e.g., transceiver functionality), or both. The data interrogation tool which will be described herein includes at least one communication assembly which communication assembly includes at least one sensor assembly including interrogation circuitry and one or more antennae. The sensor assembly comprises a multi-coil sensor assembly comprising at least two sensor coils. The use of multiple sensor coils allows one to configure the location and shape of the coils and correspondingly to shape the field pattern that is created. According to one embodiment, the sensor coil can be part of a tuned RF circuit when at least one capacitor is provided in addition to the inductance provided by the coil. According to one embodiment, the sensor takes the form of a bandpass filter, for example, if three sensor coils are included, the tuned circuit could be a seventh order bandpass filter.

Data gathering, as shown in blocks 106 to 112 of FIG. 1, may be carried out at the time of initial placement in the well of the wellbore composition comprising MEMS sensors, for example during drilling (e.g., drilling fluid comprising MEMS sensors) or during cementing (e.g., cement slurry comprising MEMS sensors) as described in more detail below. Additionally or alternatively, data gathering may be carried out at one or more times subsequent to the initial placement in the well of the wellbore composition comprising MEMS sensors. For example, data gathering may be carried out at the time of initial placement in the well of the wellbore composition comprising MEMS sensors or shortly thereafter to provide a baseline data set. As the well is operated for recovery of natural resources over a period of time, data gathering may be performed additional times, for example at regular maintenance intervals such as every 1 year, 5 years, or 10 years. The data recovered during subsequent monitoring intervals can be compared to the baseline data as well as any other data obtained from previous monitoring intervals, and such comparisons may indicate the overall condition of the wellbore. For example, changes in one or more sensed parameters may indicate one or more problems in the wellbore. Alternatively, consistency or uniformity in sensed parameters may indicate no substantive problems in the wellbore. The data may comprise any combination of parameters sensed by the MEMS sensors as present in the wellbore, including but not limited to temperature, pressure, ion concentration, stress, strain, gas concentration, etc. In an embodiment, data regarding performance of a sealant composition includes cement slurry properties such as density, rate of strength development, thickening time, fluid loss, and hydration properties; plasticity parameters; compressive strength; shrinkage and expansion characteristics; mechanical properties such as Young's Modulus and Poisson's ratio; tensile strength; resistance to ambient conditions downhole such as temperature and chemicals present; or any combination thereof, and such data may be evaluated to determine long term performance of the sealant composition (e.g., detect an occurrence of radial cracks, shear failure, and/or de-bonding within the set sealant composition) in accordance with embodiments set forth in K. Ravi and H. Xenakis, "Cementing Process Optimized to Achieve Zonal Isolation," presented at PETROTECH-2007 Conference, New Delhi, India. In an embodiment, data (e.g., sealant parameters) from a plurality of monitoring intervals is plotted over a period of time, and a resultant graph is provided showing an operating or trend line for the sensed parameters. Atypical changes in the graph as indicated for example by a sharp change in slope or a step change on the graph may provide an indication of one or more present problems or the potential for a future problem. Accordingly, remedial and/or preventive treatments or services may be applied to the wellbore to address present or potential problems.

In embodiments, the MEMS sensors are contained within a sealant composition placed substantially within the annular space between a casing and the wellbore wall. That is, substantially all of the MEMS sensors are located within or in close proximity to the annular space. In an embodiment, the wellbore servicing fluid comprising the MEMS sensors (and thus likewise the MEMS sensors) does not substantially penetrate, migrate, or travel into the formation from the wellbore. In an alternative embodiment, substantially all of the MEMS sensors are located within, adjacent to, or in close proximity to the wellbore, for example less than or equal to about 1 foot, 3 feet, 5 feet, or 10 feet from the wellbore. Such adjacent or close proximity positioning of the MEMS sensors with respect to the wellbore is in contrast to placing MEMS sensors in a fluid that is pumped into the formation in large volumes and substantially penetrates, migrates, or travels into or through the formation, for example as occurs with a fracturing fluid or a flooding fluid. Thus, in embodiments, the MEMS sensors are placed proximate or adjacent to the wellbore (in contrast to the formation at large), and provide information relevant to the wellbore itself and compositions (e.g., sealants) used therein (again in contrast to the formation or a producing zone at large). In alternative embodiments, the MEMS sensors are distributed from the wellbore into the surrounding formation (e.g., additionally or alternatively non-proximate or non-adjacent to the wellbore), for example as a component of a fracturing fluid or a flooding fluid described in more detail herein.

In embodiments, the sealant is any wellbore sealant known in the art. Examples of sealants include cementitious and non-cementitious sealants both of which are well known in the art. In embodiments, non-cementitious sealants comprise resin based systems, latex based systems, or combinations thereof. In embodiments, the sealant comprises a cement slurry with styrene-butadiene latex (e.g., as disclosed in U.S. Pat. No. 5,588,488 incorporated by reference herein in its entirety). Sealants may be utilized in setting expandable casing, which is further described below. In other embodiments, the sealant is a cement utilized for primary or secondary wellbore cementing operations, as discussed further below.

In embodiments, the sealant is cementitious and comprises a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of sealants are disclosed in U.S. Pat. Nos. 6,457,524; 7,077,203; and 7,174,962, each of which is incorporated herein by reference in its entirety. In an embodiment, the sealant comprises a sorel cement composition, which typically comprises magnesium oxide and a chloride or phosphate salt which together form for example magnesium oxychloride. Examples of magnesium oxychloride sealants are disclosed in U.S. Pat. Nos. 6,664,215 and 7,044,222, each of which is incorporated herein by reference in its entirety.

The wellbore composition (e.g., sealant) may include a sufficient amount of water to form a pumpable slurry. The water may be fresh water or salt water (e.g., an unsaturated aqueous salt solution or a saturated aqueous salt solution such as brine or seawater). In embodiments, the cement slurry may be a lightweight cement slurry containing foam (e.g., foamed cement) and/or hollow beads/microspheres. In an embodiment, the MEMS sensors are incorporated into or attached to all or a portion of the hollow microspheres. Thus, the MEMS sensors may be dispersed within the cement along with the microspheres. Examples of sealants containing microspheres are disclosed in U.S. Pat. Nos. 4,234,344; 6,457,524; and 7,174,962, each of which is incorporated herein by reference in its entirety. In an embodiment, the MEMS sensors are incorporated into a foamed cement such as those described in more detail in U.S. Pat. Nos. 6,063,738; 6,367,550; 6,547,871; and 7,174,962, each of which is incorporated by reference herein in its entirety.

In some embodiments, additives may be included in the cement composition for improving or changing the properties thereof. Examples of such additives include but are not limited to accelerators, set retarders, defoamers, fluid loss agents, weighting materials, dispersants, density-reducing agents, formation conditioning agents, lost circulation materials, thixotropic agents, suspension aids, or combinations thereof. Other mechanical property modifying additives, for example, fibers, polymers, resins, latexes, and the like can be added to further modify the mechanical properties. These additives may be included singularly or in combination. Methods for introducing these additives and their effective amounts are known to one of ordinary skill in the art.

In embodiments, the MEMS sensors are contained within a wellbore composition that forms a filtercake on the face of the formation when placed downhole. For example, various types of drilling fluids, also known as muds or drill-in fluids have been used in well drilling, such as water-based fluids, oil-based fluids (e.g., mineral oil, hydrocarbons, synthetic oils, esters, etc.), gaseous fluids, or a combination thereof. Drilling fluids typically contain suspended solids. Drilling fluids may form a thin, slick filter cake on the formation face that provides for successful drilling of the wellbore and helps prevent loss of fluid to the subterranean formation. In an embodiment, at least a portion of the MEMS remain associated with the filtercake (e.g., disposed therein) and may provide information as to a condition (e.g., thickness) and/or location of the filtercake. Additionally or in the alternative at least a portion of the MEMS remain associated with drilling fluid and may provide information as to a condition and/or location of the drilling fluid.

In embodiments, the MEMS sensors are contained within a wellbore composition that when placed downhole under suitable conditions to induce fractures within the subterranean formation. Hydrocarbon-producing wells often are stimulated by hydraulic fracturing operations, wherein a fracturing fluid may be introduced into a portion of a subterranean formation penetrated by a wellbore at a hydraulic pressure sufficient to create, enhance, and/or extend at least one fracture therein. Stimulating or treating the wellbore in such ways increases hydrocarbon production from the well. In some embodiments, the MEMS sensors may be contained within a wellbore composition that when placed downhole enters and/or resides within one or more fractures within the subterranean formation. In such embodiments, the MEMS sensors provide information as to the location and/or condition of the fluid and/or fracture during and/or after treatment. In an embodiment, at least a portion of the MEMS remain associated with a fracturing fluid and may provide information as to the condition and/or location of the fluid. Fracturing fluids often contain proppants that are deposited within the formation upon placement of the fracturing fluid therein, and in an embodiment a fracturing fluid contains one or more proppants and one or more MEMS. In an embodiment, at least a portion of the MEMS remain associated with the proppants deposited within the formation (e.g., a proppant bed) and may provide information as to the condition (e.g., thickness, density, settling, stratification, integrity, etc.) and/or location of the proppants. Additionally or in the alternative at least a portion of the MEMS remain associated with a fracture (e.g., adhere to and/or retained by a surface of a fracture) and may provide information as to the condition (e.g., length, volume, etc.) and/or location of the fracture. For example, the MEMS sensors may provide information useful for ascertaining the fracture complexity.

In embodiments, the MEMS sensors are contained in a wellbore composition (e.g., gravel pack fluid) which is employed in a gravel packing treatment, and the MEMS may provide information as to the condition and/or location of the wellbore composition during and/or after the gravel packing treatment. Gravel packing treatments are used, inter alia, to reduce the migration of unconsolidated formation particulates into the wellbore. In gravel packing operations, particulates, referred to as gravel, are carried to a wellbore in a subterranean producing zone by a servicing fluid known as carrier fluid. That is, the particulates are suspended in a carrier fluid, which may be viscosified, and the carrier fluid is pumped into a wellbore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the wellbore. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the wellbore. In an embodiment, the wellbore servicing composition (e.g., gravel pack fluid) comprises a carrier fluid, gravel and one or more MEMS. In an embodiment, at least a portion of the MEMS remain associated with the gravel deposited within the wellbore and/or formation (e.g., a gravel pack/bed) and may provide information as to the condition (e.g., thickness, density, settling, stratification, integrity, etc.) and/or location of the gravel pack/bed.

In various embodiments, the MEMS may provide information as to a location, flow path/profile, volume, density, temperature, pressure, or a combination thereof of a sealant composition, a drilling fluid, a fracturing fluid, a gravel pack fluid, or other wellbore servicing fluid in real time such that the effectiveness of such service may be monitored and/or adjusted during performance of the service to improve the result of same. Accordingly, the MEMS may aid in the initial performance of the wellbore service additionally or alternatively to providing a means for monitoring a wellbore condition or performance of the service over a period of time (e.g., over a servicing interval and/or over the life of the well). For example, the one or more MEMS sensors may be used in monitoring a gas or a liquid produced from the subterranean formation. MEMS present in the wellbore and/or formation may be used to provide information as to the condition (e.g., temperature, pressure, flow rate, composition, etc.) and/or location of a gas or liquid produced from the subterranean formation. In an embodiment, the MEMS provide information regarding the composition of a produced gas or liquid. For example, the MEMS may be used to monitor an amount of water produced in a hydrocarbon producing well (e.g., amount of water present in hydrocarbon gas or liquid), an amount of undesirable components or contaminants in a produced gas or liquid (e.g., sulfur, carbon dioxide, hydrogen sulfide, etc. present in hydrocarbon gas or liquid), or a combination thereof.

In embodiments, the data sensors added to the wellbore composition, e.g., sealant slurry, etc., are passive sensors that do not require continuous power from a battery or an external source in order to transmit real-time data. In embodiments, the data sensors are micro-electromechanical systems (MEMS) comprising one or more (and typically a plurality of) MEMS devices, referred to herein as MEMS sensors. MEMS devices are well known and any suitable MEMS devices can be used with the described sensing assembly. According to one embodiment, MEMS sensors can be a semiconductor device with mechanical features on the micrometer scale. According to this embodiment MEMS can integrate mechanical elements, sensors, actuators, and electronics on a common substrate. Such MEMS sensors include mechanical elements which are movable by an input energy (electrical energy or other type of energy). In embodiments, the substrate may comprise silicon.

According to one embodiment, MEMS sensors can include a combination of active and passive elements. According to yet another embodiment, MEMS sensors can be configured with only passive elements. According to this embodiment, a passive RFID MEMS sensor can be fabricated, for example, on a quartz, fused silica or other art recognized substrate.

Using MEMS, a sensor assembly may be designed based on a number of physical phenomena, including thermal, biological, optical, chemical, and magnetic effects or stimulation. MEMS devices are generally minute in size, have low power requirements, if any, are relatively inexpensive and are rugged, and thus are well suited for use in wellbore servicing operations.

According to one embodiment, the MEMS sensors added to a wellbore servicing fluid may be active sensors, for example powered by an internal battery that is rechargeable or otherwise powered and/or recharged by other downhole power sources such as heat capture/transfer and/or fluid flow, as described in more detail herein.

In embodiments, the data sensors comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In various embodiments, the MEMS sensors sense one or more parameters within the wellbore. In an embodiment, the parameter is temperature. Alternatively, the parameter is pH. Alternatively, the parameter is moisture content. Still alternatively, the parameter may be ion concentration (e.g., chloride, sodium, and/or potassium ions). The MEMS sensors may also sense well cement characteristic data such as stress, strain, or combinations thereof. In embodiments, the MEMS sensors of the present disclosure may comprise active materials that respond to two or more measurements. In such a way, two or more parameters may be monitored.

In addition or in the alternative, a MEMS sensor incorporated within one or more of the wellbore compositions disclosed herein may provide information that allows a condition (e.g., thickness, density, volume, settling, stratification, etc.) and/or location of the composition within the subterranean formation to be detected.

Suitable active materials, such as dielectric materials, that respond in a predictable and stable manner to changes in parameters over a long period may be identified according to methods well known in the art, for example see, e.g., Ong, Zeng and Grimes. "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43, each of which is incorporated by reference herein in its entirety. MEMS sensors suitable for the methods of the present disclosure that respond to various wellbore parameters are disclosed in U.S. Pat. No. 7,038,470 B1 that is incorporated herein by reference in its entirety.

According to one embodiment, the MEMS sensors are coupled with radio frequency identification devices (RFIDs) and can thus detect and transmit parameters and/or well cement characteristic data for monitoring the cement during its service life. According to this embodiment RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave.

Passive RF tags are gaining widespread use due to their low cost, indefinite life, simplicity, efficiency, ability to identify parts at a distance without contact (tether-free information transmission ability). These robust and tiny tags are attractive from an environmental standpoint as they require no battery. The MEMS sensor and RFID tag are preferably integrated into a single component (e.g., chip or substrate), or may alternatively be separate components operably coupled to each other. According to one embodiment, an integrated, passive MEMS/RFID sensor contains a data sensing component, an optional memory, and an RFID antenna, whereby excitation energy is received and powers up the sensor, thereby sensing a present condition and/or accessing one or more stored sensed conditions from memory and transmitting same via the RFID antenna.

According to another embodiment, the MEMS itself may be an RFID device. According to this embodiment, the MEMS is configured as a would be an electronic article surveillance (EAS) device. An EAS device is most commonly recognized for its use in store merchandise surveillance. Such a MEMS may be configured as an LC circuit or a 1-bit RFID. According to this embodiment, the MEMS comprises an inductor and a capacitor that together create an electrical resonator. Sensing is generally achieved by sweeping around the resonant frequency and detecting the dip.

In embodiments, MEMS sensors respond to different frequencies. According to one embodiment, MEMS sensors have different RFID tags, i.e., antennas that respond to RF waves of different frequencies and power the RFID chip In response to exposure to RF waves of different frequencies may be added to different wellbore compositions. Within the United States, commonly used operating bands for RFID systems center on 125 kHz, 13.56 MHz or 2.45 GHz. Frequencies may be limited in the event they are close enough to the surface to be subject to surface frequencies. Depending upon the frequency and the type of MEMS used, the range of the RFID chip can change. When a 2.45 GHz carrier frequency is used, the range of an active RFID chip can be many meters. While this is useful for remote sensing, there may be multiple transponders within the RF field. In order to prevent these devices from interacting and garbling the data, anti-collision schemes are used, as are known in the art. In embodiments, the data sensors are integrated with local tracking hardware to transmit their position as they flow within a wellbore composition such as a sealant slurry.

According to one embodiment, the sensing assembly as described is not subject to interference from the surface of the wellbore. Accordingly, the frequency can be chosen based upon convenience or a number of criteria, including but not limited to, size of the wellbore, the type of MEMS used, and the distance between the MEMS and the sensing assembly. According to one embodiment, the frequency is in the 300 to 750 MHz range, for example in the 350 to 700 MHz, for example in the 380 to 650 MHz.

The data sensors may form a network using wireless links to neighboring data sensors and have location and positioning capability through, for example, local positioning algorithms as are known in the art. The sensors may organize themselves into a network by listening to one another, therefore allowing communication of signals from the farthest sensors towards the sensors closest to the interrogator to allow uninterrupted transmission and capture of data. In such embodiments, the interrogator tool may not need to traverse the entire section of the wellbore containing MEMS sensors in order to read data gathered by such sensors. For example, the interrogator tool may only need to be lowered about half-way along the vertical length of the wellbore containing MEMS sensors. Alternatively, the interrogator tool may be lowered vertically within the wellbore to a location adjacent to a horizontal arm of a well, whereby MEMS sensors located in the horizontal arm may be read without the need for the interrogator tool to traverse the horizontal arm. Alternatively, the interrogator tool may be used at or near the surface and read the data gathered by the sensors distributed along all or a portion of the wellbore. For example, sensors located a distance away from the interrogator (e.g., at an opposite end of a length of casing or tubing) may communicate via a network formed by the sensors as described previously.

In embodiments, the MEMS sensors are ultra-small, e.g., 3 $mm^2$, such that they are pumpable in a sealant slurry. In embodiments, the MEMS device is approximately 0.01 $mm^2$ to 1 $mm^2$, alternatively 1 $mm^2$ to 3 $mm^2$, alternatively 3 $mm^2$ to 5 $mm^2$, or alternatively 5 $mm^2$ to 10 $mm^2$. In embodiments, the data sensors are capable of providing data throughout the cement service life. In embodiments, the data sensors are capable of providing data for up to 100 years. In an embodiment, the wellbore composition comprises an amount of MEMS effective to measure one or more desired parameters. In various embodiments, the wellbore composition comprises an effective amount of MEMS such that sensed readings may be obtained at intervals of about 1 foot, alternatively about 6 inches, or alternatively about 1 inch, along the portion of the wellbore containing the MEMS. In an embodiment, the MEMS sensors may be present in the wellbore composition in an amount of from about 0.001 to about 10 weight percent. Alternatively, the MEMS may be present in the wellbore composition in an amount of from about 0.01 to about 5 weight percent. In embodiments, the sensors may have dimensions (e.g., diameters or other dimensions) that range from nanoscale, e.g., about 1 to 1000 nm (e.g., NEMS), to a micrometer range, e.g., about 1 to 1000 μm (e.g., MEMS), or alternatively any size from about 1 nm to about 1 mm. In embodiments, the MEMS sensors may be present in the wellbore composition in an amount of from about 5 volume percent to about 30 volume percent.

In various embodiments, the size and/or amount of sensors present in a wellbore composition (e.g., the sensor loading or concentration) may be selected such that the resultant wellbore servicing composition is readily pumpable without damaging the sensors and/or without having the sensors undesirably settle out (e.g., screen out) in the pumping equipment (e.g., pumps, conduits, tanks, etc.) and/or upon placement in the wellbore. Also, the concentration/loading of the sensors within the wellbore servicing fluid may be selected to provide a sufficient average distance between sensors to allow for networking of the sensors (e.g., daisy-chaining) in embodiments using such networks, as described in more detail herein. For example, such distance may be a percentage of the average communication distance for a given sensor type. By way of example, a given sensor having a 2 inch communication range in a given wellbore composition should be loaded into the wellbore composition in an amount that the average distance between sensors in less than 2 inches (e.g., less than 1.9, 1.8, 1.7, 1.6, 1.5, 1.4, 1.3, 1.2, 1.1, 1.0, etc. inches). The size of sensors and the amount may be selected so that they are stable, do not float or sink, in the well treating fluid. The size of the sensor could range from nano size to microns. In some embodiments, the sensors may be nanoelectromechanical systems (NEMS), MEMS, or combinations thereof. Unless otherwise indicated herein, it should be understood that any suitable micro and/or nano sized sensors or combinations thereof may be employed. The embodiments disclosed herein should not otherwise be limited by the specific type of micro and/or nano sensor employed unless otherwise indicated or prescribed by the functional requirements thereof, and specifically NEMS may be used in addition to or in lieu of MEMS sensors in the various embodiments disclosed herein.

In embodiments, the MEMS sensors comprise passive (remain unpowered when not being interrogated) sensors energized by energy radiated from a data interrogation tool. The data interrogation tool may comprise an energy transceiver sending energy (e.g., radio waves) to and receiving signals from the MEMS sensors and a processor processing the received signals. The signals from the MEMS sensors are received by a sensor assembly that includes one or more antennae and one or more sensing circuits. Sensing circuits includes at least one sensor including a plurality of sensor coils.

The data interrogation tool may further comprise a memory component, a communications component, or both. The memory component may store raw and/or processed data received from the MEMS sensors, and the communications component may transmit raw data to the processor and/or transmit processed data to another receiver, for example located at the surface. The tool components (e.g., transceiver, processor, memory component, and communications component) are coupled together and in signal communication with each other.

In an embodiment, one or more of the data interrogator components may be integrated into a tool or unit that is temporarily or permanently placed downhole (e.g., a downhole module), for example prior to, concurrent with, and/or subsequent to placement of the MEMS sensors in the wellbore. In an embodiment, a removable downhole module comprises a transceiver and a memory component, and the downhole module is placed into the wellbore, reads data from the MEMS sensors, stores the data in the memory component, is removed from the wellbore, and the raw data is accessed. Alternatively, the removable downhole module may have a processor to process and store data in the memory component, which is subsequently accessed at the surface when the tool is removed from the wellbore. Alternatively, the removable downhole module may have a communications component to transmit raw data to a processor and/or transmit processed data to another receiver, for example located at the surface. The communications component may communicate via wired or wireless communications. For example, the downhole module may communicate with a component or other node on the surface via a network of MEMS sensors, or cable or other communications/telemetry device such as a radio frequency, electromagnetic telemetry device or an acoustic telemetry device. The removable downhole module may be intermittently positioned downhole via any suitable conveyance, for example wire-line, coiled tubing, straight tubing, gravity, pumping, etc., to monitor conditions at various times during the life of the well.

In embodiments, the data interrogation tool comprises a permanent or semi-permanent downhole module that remains downhole for extended periods of time. For example, a semi-permanent downhole module may be retrieved and data downloaded once every few months or years. Alternatively, a permanent downhole module may remain in the well throughout the service life of well. In an embodiment, a permanent or semi-permanent downhole module comprises a transceiver and a memory component, and the downhole module is placed into the wellbore, reads data from the MEMS sensors, optionally stores the data in the memory component, and transmits the read and optionally stored data to the surface. Alternatively, the permanent or semi-permanent downhole module may have a processor to process and sensed data into processed data, which may be stored in memory and/or transmit to the surface. The permanent or semi-permanent downhole module may have a communications component to transmit raw data to a processor and/or transmit processed data to another receiver, for example located at the surface. The communications component may communicate via wired or wireless communications. For example, the downhole module may communicate with a component or other node on the surface via a network of MEMS sensors, or a cable or other communications/telemetry device such as a radio frequency, electromagnetic telemetry device or an acoustic telemetry device.

In embodiments, the data interrogation tool comprises an RF energy source incorporated into its internal circuitry and the data sensors are passively energized using an RF antenna, which picks up energy from the RF energy source. In an embodiment, the data interrogation tool is integrated with an RF transceiver.

In an embodiment, the data interrogation tool traverses within a casing in the well and reads MEMS sensors located in a wellbore servicing fluid or composition, for example a sealant (e.g., cement) sheath surrounding the casing, located in the annular space between the casing and the wellbore wall. In embodiments, the interrogator senses the MEMS sensors when in close proximity with the sensors, typically via traversing a removable downhole component along a length of the wellbore comprising the MEMS sensors. In an embodiment, close proximity comprises a radial distance from a point within the casing to a planar point within an annular space between the casing and the wellbore. In embodiments, close proximity comprises a distance of 0.01 to 1 meter. According to one embodiment, close proximity is less than 0.75 meters, for example, less than 0.6 meters, for example from about 0.01 to about 0.4 meters. In this embodiment, any type of MEMS may be used; however, this embodiment is particularly useful when using passive RFID MEMS. In other embodiments, the MEMS sensors (e.g., MEMS/RFID sensors) may be empowered and interrogated by the RF transceiver from a distance, for example a distance of greater than 1 meter, for example, greater than 10 m, or alternatively from the surface or from an adjacent offset well.

The frequency at which the transceiver interrogates the sensor and the distance between the interrogation tool and the sensor are selected based upon the type of MEMS used and the environmental characteristics. According to embodiments, the transceiver interrogates the sensor with RF energy at a frequency between 380 to 650 MHz and in close proximity, e.g., between about 0.1 m to about 0.6 m.

In embodiments, the MEMS sensors incorporated into wellbore cement and used to collect data during and/or after cementing the wellbore. The data interrogation tool may be positioned downhole prior to and/or during cementing, for example integrated into a component such as casing, casing attachment, plug, cement shoe, or expanding device. Alternatively, the data interrogation tool is positioned downhole upon completion of cementing, for example conveyed downhole via wireline. The cementing methods disclosed herein may optionally comprise the step of foaming the cement composition using a gas such as nitrogen or air. The foamed cement compositions may comprise a foaming surfactant and optionally a foaming stabilizer. The MEMS sensors may be incorporated into a sealant composition and placed downhole, for example during primary cementing (e.g., conventional or reverse circulation cementing), secondary cementing (e.g., squeeze cementing), or other sealing operation (e.g., behind an expandable casing).

In primary cementing, cement is positioned in a wellbore to isolate an adjacent portion of the subterranean formation and provide support to an adjacent conduit (e.g., casing). The cement forms a barrier that prevents fluids (e.g., water or hydrocarbons) In the subterranean formation from migrating into adjacent zones or other subterranean formations. In embodiments, the wellbore in which the cement is positioned belongs to a horizontal or multilateral wellbore configuration. It is to be understood that a multilateral wellbore configuration includes at least two principal wellbores connected by one or more ancillary wellbores.

Figure 2:
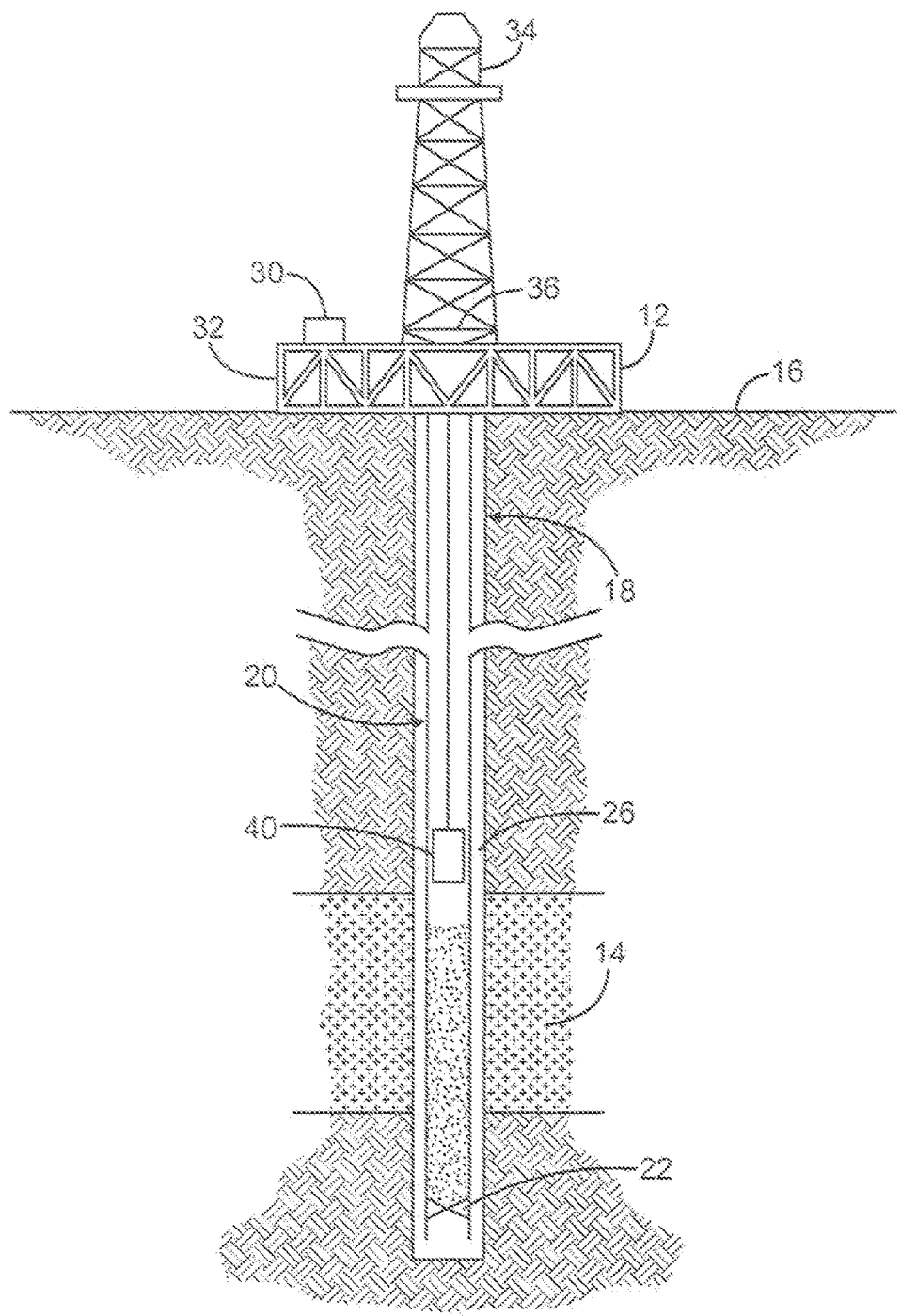
FIG. 2 is a schematic of a typical onshore oil or gas drilling rig and wellbore in accordance with some embodiments.

FIG. 2, which shows a typical onshore oil or gas drilling rig and wellbore, will be used to clarify the methods of the present disclosure, with the understanding that the present disclosure is likewise applicable to offshore rigs and wellbores. Rig 12 is centered over a subterranean oil or gas formation 14 located below the earth's surface 16. Rig 12 includes a work deck 32 that supports a derrick 34. Derrick 34 supports a hoisting apparatus 36 for raising and lowering pipe strings such as casing 20. Pump 30 is capable of pumping a variety of wellbore compositions (e.g., drilling fluid or cement) into the well and includes a pressure measurement device that provides a pressure reading at the pump discharge. Wellbore 18 has been drilled through the various earth strata, including formation 14. Upon completion of wellbore drilling, casing 20 is often placed in the wellbore 18 to facilitate the production of oil and gas from the formation 14. Casing 20 is a string of pipes that extends down wellbore 18, through which oil and gas will eventually be extracted. A cement or casing shoe 22 is typically attached to the end of the casing string when the casing string is run into the wellbore. Casing shoe 22 guides casing 20 toward the center of the hole and minimizes problems associated with hitting rock ledges or washouts in wellbore 18 as the casing string is lowered into the well. Casing shoe, 22, may be a guide shoe or a float shoe, and typically comprises a tapered, often bullet-nosed piece of equipment found on the bottom of casing string 20. Casing shoe, 22, may be a float shoe fitted with an open bottom and a valve that serves to prevent reverse flow, or U-tubing, of cement slurry from annulus 26 into casing 20 as casing 20 is run into wellbore 18. The region between casing 20 and the wall of wellbore 18 is known as the casing annulus 26. To fill up casing annulus 26 and secure casing 20 in place, casing 20 is usually "cemented" in wellbore 18, which is referred to as "primary cementing." A data interrogator tool 40 is shown in the wellbore 18.

In an embodiment, the method of this disclosure is used for monitoring primary cement during and/or subsequent to a conventional primary cementing operation. In this conventional primary cementing embodiment, MEMS sensors are mixed into a cement slurry, block 102 of FIG. 1, and the cement slurry is then pumped down the inside of casing 20, block 104 of FIG. 1. As the slurry reaches the bottom of casing 20, it flows out of casing 20 and into casing annulus 26 between casing 20 and the wall of wellbore 18. As cement slurry flows up annulus 26, it displaces any fluid in the wellbore. To ensure no cement remains inside casing 20, devices called "wipers" may be pumped by a wellbore servicing fluid (e.g., drilling mud) through casing 20 behind the cement. As described in more detail herein, the wellbore servicing fluids such as the cement slurry and/or wiper conveyance fluid (e.g., drilling mud) may contain MEMS sensors which aid in detection and/or positioning of the wellbore servicing fluid and/or a mechanical component such as a wiper plug, casing shoe, etc. The wiper contacts the inside surface of casing 20 and pushes any remaining cement out of casing 20. When cement slurry reaches the earth's surface 16, and annulus 26 is filled with slurry, pumping is terminated and the cement is allowed to set. The MEMS sensors of the present disclosure may also be used to determine one or more parameters during placement and/or curing of the cement slurry. Also, the MEMS sensors of the present disclosure may also be used to determine completion of the primary cementing operation, as further discussed herein below.

Referring back to FIG. 1, during cementing, or subsequent the setting of cement, a data interrogation tool may be positioned in wellbore 18, as at block 106 of FIG. 1. For example, the wiper may be equipped with a data interrogation tool and may read data from the MEMS while being pumped downhole and transmit same to the surface. Alternatively, an interrogator tool may be run into the wellbore following completion of cementing a segment of casing, for example as part of the drill string during resumed drilling operations. Alternatively, the interrogator tool may be run downhole via a wireline or other conveyance. The data interrogation tool may then be signaled to interrogate the sensors (block 108 of FIG. 1) whereby the sensors are activated to record and/or transmit data, block 110 of FIG. 1. The data interrogation tool communicates the data to a processor 112 whereby data sensor (and likewise cement slurry) position and cement integrity may be determined via analyzing sensed parameters for changes, trends, expected values, etc. For example, such data may reveal conditions that may be adverse to cement curing. The sensors may provide a temperature profile over the length of the cement sheath, with a uniform temperature profile likewise indicating a uniform cure (e.g., produced via heat of hydration of the cement during curing) or a change in temperature might indicate the influx of formation fluid (e.g., presence of water and/or hydrocarbons) that may degrade the cement during the transition from slurry to set cement. Alternatively, such data may indicate a zone of reduced, minimal, or missing sensors, which would indicate a loss of cement corresponding to the area (e.g., a loss/void zone or water influx/washout). Such methods may be available with various cement techniques described herein such as conventional or reverse primary cementing.

Due to the high pressure at which the cement is pumped during conventional primary cementing (pump down the casing and up the annulus), fluid from the cement slurry may leak off into existing low pressure zones traversed by the wellbore. This may adversely affect the cement, and incur undesirable expense for remedial cementing operations (e.g., squeeze cementing as discussed below) to position the cement in the annulus. Such leak off may be detected via the present disclosure as described previously. Additionally, conventional circulating cementing may be time-consuming, and therefore relatively expensive, because cement is pumped all the way down casing 20 and back up annulus 26.

One method of avoiding problems associated with conventional primary cementing is to employ reverse circulation primary cementing. Reverse circulation cementing is a term of art used to describe a method where a cement slurry is pumped down casing annulus 26 instead of into casing 20. The cement slurry displaces any fluid as it is pumped down annulus 26. Fluid in the annulus is forced down annulus 26, into casing 20 (along with any fluid in the casing), and then back up to earth's surface 16. When reverse circulation cementing, casing shoe 22 comprises a valve that is adjusted to allow flow into casing 20 and then sealed after the cementing operation is complete. Once slurry is pumped to the bottom of casing 20 and fills annulus 26, pumping is terminated and the cement is allowed to set in annulus 26. Examples of reverse cementing applications are disclosed in U.S. Pat. Nos. 6,920,929 and 6,244,342, each of which is incorporated herein by reference in its entirety.

In embodiments of the present disclosure, sealant slurries comprising MEMS data sensors are pumped down the annulus in reverse circulation applications, a data interrogator is located within the wellbore (e.g., integrated into the casing shoe) and sealant performance is monitored as described with respect to the conventional primary sealing method disclosed hereinabove. Additionally, the data sensors of the present disclosure may also be used to determine completion of a reverse circulation operation, as further discussed below.

Secondary cementing within a wellbore may be carried out subsequent to primary cementing operations. A common example of secondary cementing is squeeze cementing wherein a sealant such as a cement composition is forced under pressure into one or more permeable zones within the wellbore to seal such zones. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The sealant (e.g., secondary cement composition) sets within the permeable zones, thereby forming a hard mass to plug those zones and prevent fluid from passing therethrough (i.e., prevents communication of fluids between the wellbore and the formation via the permeable zone). Various procedures that may be followed to use a sealant composition in a wellbore are described in U.S. Pat. No. 5,346,012, which is incorporated by reference herein in its entirety. In various embodiments, a sealant composition comprising MEMS sensors is used to repair holes, channels, voids, and microannuli in casing, cement sheath, gravel packs, and the like as described in U.S. Pat. Nos. 5,121,795; 5,123,487; and 5,127,473, each of which is incorporated by reference herein in its entirety.

In embodiments, the method of the present disclosure may be employed in a secondary cementing operation. In these embodiments, data sensors are mixed with a sealant composition (e.g., a secondary cement slurry) at block 102 of FIG. 1 and subsequent or during positioning and hardening of the cement, the sensors are interrogated to monitor the performance of the secondary cement in an analogous manner to the incorporation and monitoring of the data sensors in primary cementing methods disclosed hereinabove. For example, the MEMS sensors may be used to verify that the secondary sealant is functioning properly and/or to monitor its long-term integrity.

In embodiments, the methods of the present disclosure are utilized for monitoring cementitious sealants (e.g., hydraulic cement), non-cementitious (e.g., polymer, latex or resin systems), or combinations thereof, which may be used in primary, secondary, or other sealing applications. For example, expandable tubulars such as pipe, pipe string, casing, liner, or the like are often sealed in a subterranean formation. The expandable tubular (e.g., casing) is placed in the wellbore, a sealing composition is placed into the wellbore, the expandable tubular is expanded, and the sealing composition is allowed to set in the wellbore. For example, after expandable casing is placed downhole, a mandrel may be run through the casing to expand the casing diametrically, with expansions up to 25% possible. The expandable tubular may be placed in the wellbore before or after placing the sealing composition in the wellbore. The expandable tubular may be expanded before, during, or after the set of the sealing composition. When the tubular is expanded during or after the set of the sealing composition, resilient compositions will remain competent due to their elasticity and compressibility. Additional tubulars may be used to extend the wellbore into the subterranean formation below the first tubular as is known to those of skill in the art. Sealant compositions and methods of using the compositions with expandable tubulars are disclosed in U.S. Pat. Nos. 6,722,433 and 7,040,404 and U.S. Pat. Pub. No. 2004/0167248, each of which is incorporated by reference herein in its entirety. In expandable tubular embodiments, the sealants may comprise compressible hydraulic cement compositions and/or non-cementitious compositions.

Compressible hydraulic cement compositions have been developed which remain competent (continue to support and seal the pipe) when compressed, and such compositions may comprise MEMS sensors. The sealant composition is placed in the annulus between the wellbore and the pipe or pipe string, the sealant is allowed to harden into an impermeable mass, and thereafter, the expandable pipe or pipe string is expanded whereby the hardened sealant composition is compressed. In embodiments, the compressible foamed sealant composition comprises a hydraulic cement, a rubber latex, a rubber latex stabilizer, a gas and a mixture of foaming and foam stabilizing surfactants. Suitable hydraulic cements include, but are not limited to, Portland cement and calcium aluminate cement.

Often, non-cementitious resilient sealants with comparable strength to cement, but greater elasticity and compressibility, are required for cementing expandable casing. In embodiments, these sealants comprise polymeric sealing compositions, and such compositions may comprise MEMS sensors. In an embodiment, the sealants composition comprises a polymer and a metal containing compound. In embodiments, the polymer comprises copolymers, terpolymers, and interpolymers. The metal-containing compounds may comprise zinc, tin, iron, selenium magnesium, chromium, or cadmium. The compounds may be in the form of an oxide, carboxylic acid salt, a complex with dithiocarbamate ligand, or a complex with mercaptobenzothiazole ligand. In embodiments, the sealant comprises a mixture of latex, dithio carbamate, zinc oxide, and sulfur.

In embodiments, the methods of the present disclosure comprise adding data sensors to a sealant to be used behind expandable casing to monitor the integrity of the sealant upon expansion of the casing and during the service life of the sealant. In this embodiment, the sensors may comprise MEMS sensors capable of measuring, for example, moisture and/or temperature change. If the sealant develops cracks, water influx may thus be detected via moisture and/or temperature indication.

In an embodiment, the MEMS sensors are added to one or more wellbore servicing compositions used or placed downhole in drilling or completing a monodiameter wellbore as disclosed in U.S. Pat. No. 7,066,284 and U.S. Pat. Pub. No. 2005/0241855, each of which is incorporated by reference herein in its entirety. In an embodiment, the MEMS sensors are included in a chemical casing composition used in a monodiameter wellbore. In another embodiment, the MEMS sensors are included in compositions (e.g., sealants) used to place expandable casing or tubulars in a monodiameter wellbore. Examples of chemical casings are disclosed in U.S. Pat. Nos. 6,702,044; 6,823,940; and 6,848,519, each of which is incorporated herein by reference in its entirety.

In one embodiment, the MEMS sensors are used to gather data, e.g., sealant data, and monitor the long-term integrity of the wellbore composition, e.g., sealant composition, placed in a wellbore, for example a wellbore for the recovery of natural resources such as water or hydrocarbons or an injection well for disposal or storage. In an embodiment, data/information gathered and/or derived from MEMS sensors in a downhole wellbore composition e.g., sealant composition, comprises at least a portion of the input and/or output to into one or more calculators, simulations, or models used to predict, select, and/or monitor the performance of wellbore compositions e.g., sealant compositions, over the life of a well. Such models and simulators may be used to select a wellbore composition, e.g., sealant composition, comprising MEMS for use in a wellbore. After placement in the wellbore, the MEMS sensors may provide data that can be used to refine, recalibrate, or correct the models and simulators. Furthermore, the MEMS sensors can be used to monitor and record the downhole conditions that the composition, e.g., sealant, is subjected to, and composition, e.g., sealant, performance may be correlated to such long term data to provide an indication of problems or the potential for problems in the same or different wellbores. In various embodiments, data gathered from MEMS sensors is used to select a wellbore composition, e.g., sealant composition, or otherwise evaluate or monitor such sealants, as disclosed in U.S. Pat. Nos. 6,697,738; 6,922,637; and 7,133,778, each of which is incorporated by reference herein in its entirety.

In an embodiment, the compositions and methodologies of this disclosure are employed in an operating environment that generally comprises a wellbore that penetrates a subterranean formation for the purpose of recovering hydrocarbons, storing hydrocarbons, injection of carbon dioxide, storage of carbon dioxide, disposal of carbon dioxide, and the like, and the MEMS located downhole (e.g., within the wellbore and/or surrounding formation) may provide information as to a condition and/or location of the composition and/or the subterranean formation. For example, the MEMS may provide information as to a location, flow path/profile, volume, density, temperature, pressure, or a combination thereof of a hydrocarbon (e.g., natural gas stored in a salt dome) or carbon dioxide placed in a subterranean formation such that effectiveness of the placement may be monitored and evaluated, for example detecting leaks, determining remaining storage capacity in the formation, etc. In some embodiments, the compositions of this disclosure are employed in an enhanced oil recovery operation wherein a wellbore that penetrates a subterranean formation may be subjected to the Injection of gases (e.g., carbon dioxide) so as to improve hydrocarbon recovery from said wellbore, and the MEMS may provide information as to a condition and/or location of the composition and/or the subterranean formation. For example, the MEMS may provide information as to a location, flow path/profile, volume, density, temperature, pressure, or a combination thereof of carbon dioxide used in a carbon dioxide flooding enhanced oil recovery operation in real time such that the effectiveness of such operation may be monitored and/or adjusted in real time during performance of the operation to improve the result of same.

Figure 4:
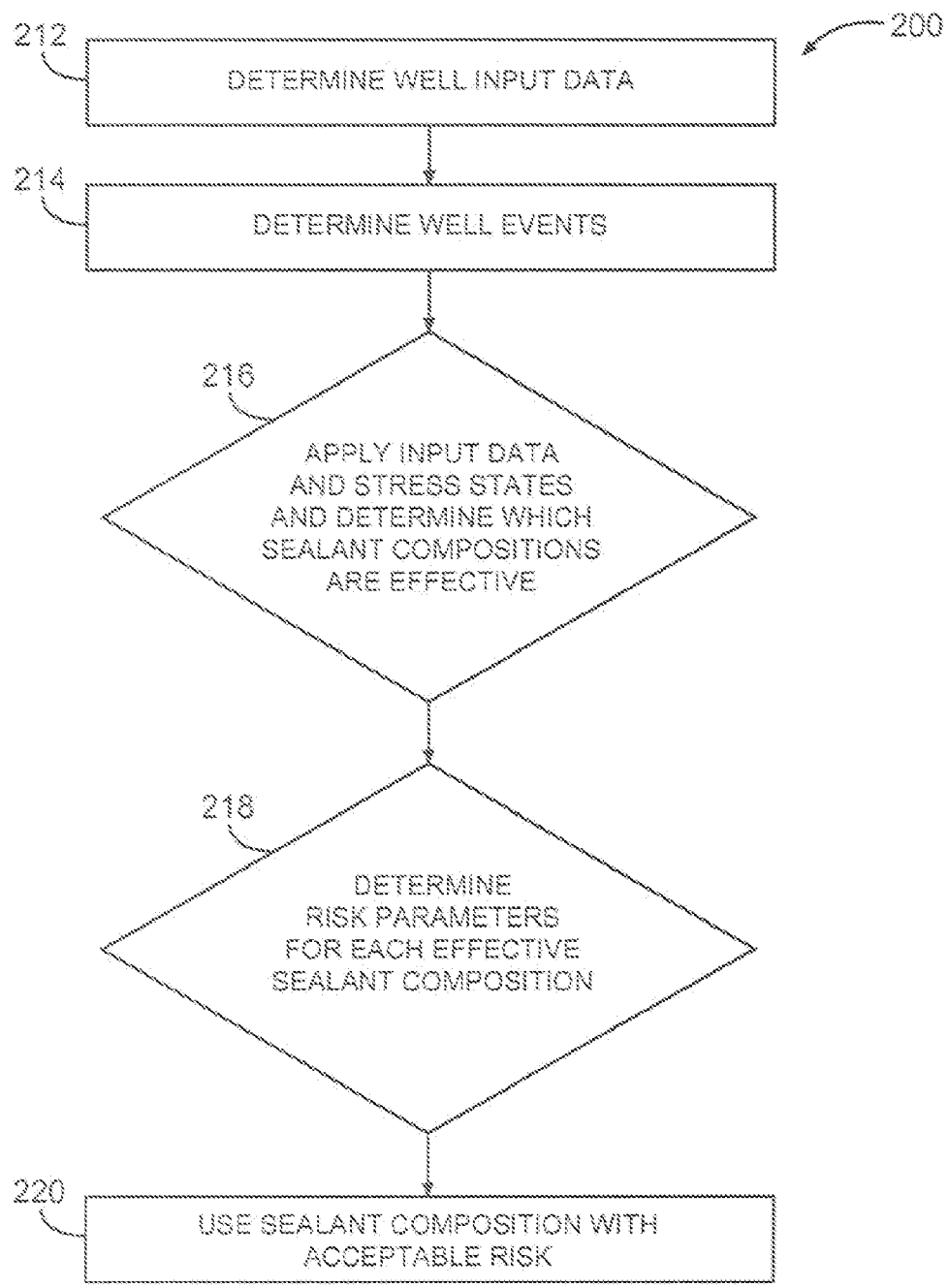
FIG. 4 is a flow chart illustrating a method for selecting between a group of sealant compositions in accordance with some embodiments.

Referring to FIG. 4, a method 200 for selecting a sealant (e.g., a cementing composition) for sealing a subterranean zone penetrated by a wellbore according to the present embodiment basically comprises determining a group of effective compositions from a group of compositions given estimated conditions experienced during the life of the well, and estimating the risk parameters for each of the group of effective compositions. In an alternative embodiment, actual measured conditions experienced during the life of the well, in addition to or in lieu of the estimated conditions, may be used. Such actual measured conditions may be obtained for example via sealant compositions comprising MEMS sensors as described herein. Effectiveness considerations include concerns that the sealant composition be stable under downhole conditions of pressure and temperature, resist downhole chemicals, and possess the mechanical properties to withstand stresses from various downhole operations to provide zonal isolation for the life of the well.

In step 212, well input data for a particular well is determined. Well input data includes routinely measurable or calculable parameters inherent in a well, including vertical depth of the well, overburden gradient, pore pressure, maximum and minimum horizontal stresses, hole size, casing outer diameter, casing inner diameter, density of drilling fluid, desired density of sealant slurry for pumping, density of completion fluid, and top of sealant. As will be discussed in greater detail with reference to step 214, the well can be computer modeled. In modeling, the stress state in the well at the end of drilling, and before the sealant slurry is pumped into the annular space, affects the stress state for the interface boundary between the rock and the sealant composition. Thus, the stress state in the rock with the drilling fluid is evaluated, and properties of the rock such as Young's modulus, Poisson's ratio, and yield parameters are used to analyze the rock stress state. These terms and their methods of determination are well known to those skilled in the art. It is understood that well input data will vary between individual wells. In an alternative embodiment, well input data includes data that is obtained via sealant compositions comprising MEMS sensors as described herein.

In step 214, the well events applicable to the well are determined. For example, cement hydration (setting) is a well event. Other well events include pressure testing, well completions, hydraulic fracturing, hydrocarbon production, fluid injection, perforation, subsequent drilling, formation movement as a result of producing hydrocarbons at high rates from unconsolidated formation, and tectonic movement after the sealant composition has been pumped in place. Well events include those events that are certain to happen during the life of the well, such as cement hydration, and those events that are readily predicted to occur during the life of the well, given a particular well's location, rock type, and other factors well known in the art. In an embodiment, well events and data associated therewith may be obtained via sealant compositions comprising MEMS sensors as described herein.

Each well event is associated with a certain type of stress, for example, cement hydration is associated with shrinkage, pressure testing is associated with pressure, well completions, hydraulic fracturing, and hydrocarbon production are associated with pressure and temperature, fluid injection is associated with temperature, formation movement is associated with load, and perforation and subsequent drilling are associated with dynamic load. As can be appreciated, each type of stress can be characterized by an equation for the stress state (collectively "well event stress states"), as described in more detail in U.S. Pat. No. 7,133,778 which is incorporated herein by reference in its entirety.

In step 216, the well input data, the well event stress states, and the sealant data are used to determine the effect of well events on the integrity of the sealant sheath during the life of the well for each of the sealant compositions. The sealant compositions that would be effective for sealing the subterranean zone and their capacity from its elastic limit are determined. In an alternative embodiment, the estimated effects over the life of the well are compared to and/or corrected in comparison to corresponding actual data gathered over the life of the well via sealant compositions comprising MEMS sensors as described herein. Step 216 concludes by determining which sealant compositions would be effective in maintaining the integrity of the resulting cement sheath for the life of the well.

In step 218, parameters for risk of sealant failure for the effective sealant compositions are determined. For example, even though a sealant composition is deemed effective, one sealant composition may be more effective than another. In one embodiment, the risk parameters are calculated as percentages of sealant competency during the determination of effectiveness in step 216. In an alternative embodiment, the risk parameters are compared to and/or corrected in comparison to actual data gathered over the life of the well via sealant compositions comprising MEMS sensors as described herein.

Step 218 provides data that allows a user to perform a cost benefit analysis. Due to the high cost of remedial operations, it is important that an effective sealant composition is selected for the conditions anticipated to be experienced during the life of the well. It is understood that each of the sealant compositions has a readily calculable monetary cost. Under certain conditions, several sealant compositions may be equally efficacious, yet one may have the added virtue of being less expensive. Thus, it should be used to minimize costs. More commonly, one sealant composition will be more efficacious, but also more expensive. Accordingly, in step 220, an effective sealant composition with acceptable risk parameters is selected given the desired cost. Furthermore, the overall results of steps 200-220 can be compared to actual data that is obtained via sealant compositions comprising MEMS sensors as described herein, and such data may be used to modify and/or correct the inputs and/or outputs to the various steps 200-220 to improve the accuracy of same.

As discussed above and with reference to FIG. 2, wipers are often utilized during conventional primary cementing to force cement slurry out of the casing. The wiper plug also serves another purpose: typically, the end of a cementing operation is signaled when the wiper plug contacts a restriction (e.g., casing shoe) inside the casing 20 at the bottom of the string. When the plug contacts the restriction, a sudden pressure increase at pump 30 is registered. In this way, it can be determined when the cement has been displaced from the casing 20 and fluid flow returning to the surface via casing annulus 26 stops.

In reverse circulation cementing, it is also necessary to correctly determine when cement slurry completely fills the annulus 26. Continuing to pump cement into annulus 26 after cement has reached the far end of annulus 26 forces cement into the far end of casing 20, which could incur lost time if cement must be drilled out to continue drilling operations.

The methods disclosed herein may be utilized to determine when cement slurry has been appropriately positioned downhole. Furthermore, as discussed below, the methods of the present disclosure may additionally comprise using a MEMS sensor to actuate a valve or other mechanical means to close and prevent cement from entering the casing upon determination of completion of a cementing operation.

Figure 3:
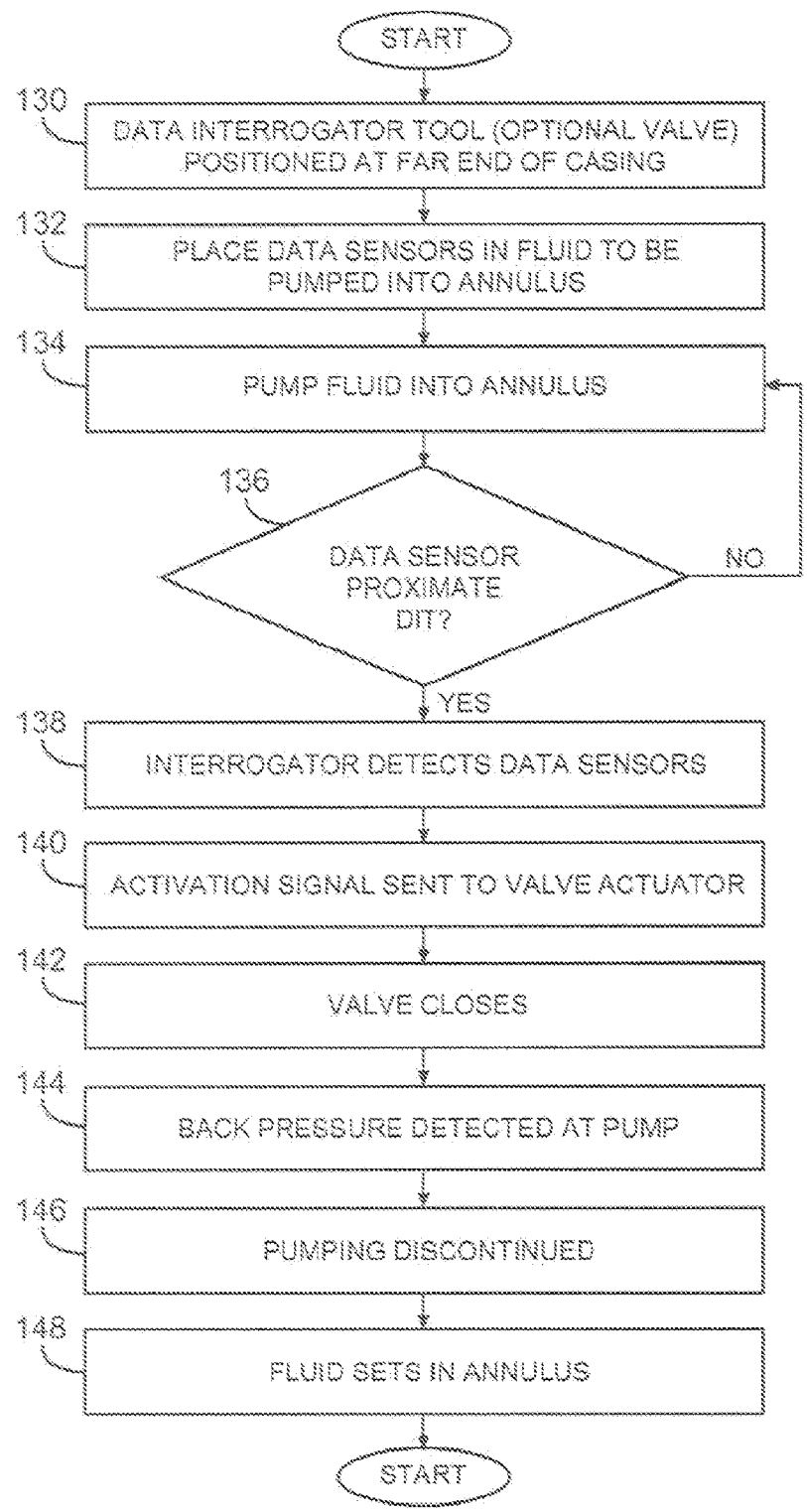
FIG. 3 is a flow chart illustrating a method for determining when a reverse cementing operation is complete and for subsequent optional activation of a downhole tool in accordance with some embodiments.

The way in which the method of the present disclosure may be used to signal when cement is appropriately positioned within annulus 26 will now be described within the context of a reverse circulation cementing operation. FIG. 3 is a flowchart of a method for determining completion of a cementing operation and optionally further actuating a downhole tool upon completion (or to initiate completion) of the cementing operation. This description will reference the flowchart of FIG. 3, as well as the wellbore depiction of FIG. 2.

At block 130, a data interrogation tool as described hereinabove is positioned at the far end of casing 20. In an embodiment, the data interrogation tool is incorporated with or adjacent to a casing shoe positioned at the bottom end of the casing and in communication with operators at the surface. At block 132, MEMS sensors are added to a fluid (e.g., cement slurry, spacer fluid, displacement fluid, etc.) to be pumped into annulus 26. At block 134, cement slurry is pumped into annulus 26. In an embodiment, MEMS sensors may be placed in substantially all of the cement slurry pumped into the wellbore. In an alternative embodiment, MEMS sensors may be placed in a leading plug or otherwise placed in an initial portion of the cement to indicate a leading edge of the cement slurry. In an embodiment, MEMS sensors are placed in leading and trailing plugs to signal the beginning and end of the cement slurry. While cement is continuously pumped into annulus 26, at decision 136, the data interrogation tool is attempting to detect whether the data sensors are in communicative (e.g., close) proximity with the data interrogation tool. As long as no data sensors are detected, the pumping of additional cement into the annulus continues. When the data interrogation tool detects the sensors at block 138 indicating that the leading edge of the cement has reached the bottom of the casing, the interrogator sends a signal to terminate pumping. The cement in the annulus is allowed to set and form a substantially impermeable mass which physically supports and positions the casing in the wellbore and bonds the casing to the walls of the wellbore in block 148.

If the fluid of block 130 is the cement slurry, MEMS-based data sensors are incorporated within the set cement, and parameters of the cement (e.g., temperature, pressure, ion concentration, stress, strain, etc.) can be monitored during placement and for the duration of the service life of the cement according to methods disclosed hereinabove. Alternatively, the data sensors may be added to an interface fluid (e.g., spacer fluid or other fluid plug) introduced into the annulus prior to and/or after introduction of cement slurry into the annulus.

The method just described for determination of the completion of a primary wellbore cementing operation may further comprise the activation of a downhole tool. For example, at block 130, a valve or other tool may be operably associated with a data interrogator tool at the far end of the casing. This valve may be contained within float shoe 22, for example, as disclosed hereinabove. Again, float shoe 22 may contain an integral data interrogator tool, or may otherwise be coupled to a data interrogator tool. For example, the data interrogator tool may be positioned between casing 20 and float shoe 22. Following the method previously described and blocks 132 to 136, pumping continues as the data interrogator tool detects the presence or absence of data sensors in close proximity to the interrogator tool (dependent upon the specific method cementing method being employed, e.g., reverse circulation, and the positioning of the sensors within the cement flow). Upon detection of a determinative presence or absence of sensors in close proximity indicating the termination of the cement slurry, the data interrogator tool sends a signal to actuate the tool (e.g., valve) at block 140. At block 142, the valve closes, sealing the casing and preventing cement from entering the portion of casing string above the valve in a reverse cementing operation. At block 144, the closing of the valve at 142, causes an increase in back pressure that is detected at the hydraulic pump 30. At block 146, pumping is discontinued, and cement is allowed to set in the annulus at block 148. In embodiments wherein data sensors have been incorporated throughout the cement, parameters of the cement (and thus cement integrity) can additionally be monitored during placement and for the duration of the service life of the cement according to methods disclosed hereinabove.

In embodiments, systems for sensing, communicating and evaluating wellbore parameters may include the wellbore 18; the casing 20 or other workstring, toolstring, production string, tubular, coiled tubing, wireline, or any other physical structure or conveyance extending downhole from the surface; MEMS sensors 52 that may be placed into the wellbore 18 and/or surrounding formation 14, for example, via a wellbore servicing fluid; and a device or plurality of devices for interrogating the MEMS sensors 52 to gather/collect data generated by the MEMS sensors 52, for transmitting the data from the MEMS sensors 52 to the earth's surface 16, for receiving communications and/or data to the earth's surface, for processing the data, or any combination thereof, referred to collectively herein a data interrogation/communication assembly units or in some instances as a data interrogator or data interrogation tool. Unless otherwise specified, it is understood that such devices as disclosed in the various embodiments herein will have MEMS sensor interrogation functionality, communication functionality (e.g., transceiver functionality), or both, as will be apparent from the particular embodiments and associated context disclosed herein.

The wellbore servicing fluid comprising the MEMS sensors 52 may comprise a drilling fluid, a spacer fluid, a sealant, a fracturing fluid, a gravel pack fluid, a completion fluid, or any other fluid placed downhole. In addition, the MEMS sensors 52 may be configured to measure physical parameters such as temperature, stress and strain, as well as chemical parameters such as $CO_2$ concentration, $H_2S$ concentration, $CH_4$ concentration, moisture content, pH, $Na^+$ concentration, $K^+$ concentration, and $Cl^-$ concentration. Various embodiments described herein are directed to interrogation/communication assembly units that are dispersed or distributed at intervals along a length of the casing 20 and form a communication network for transmitting and/or receiving communications to/from a location downhole and the surface, with the further understanding that the interrogation/communication assembly units may be otherwise physically supported by a workstring, toolstring, production string, tubular, coiled tubing, wireline, or any other physical structure or conveyance extending downhole from the surface.

Figure 5:
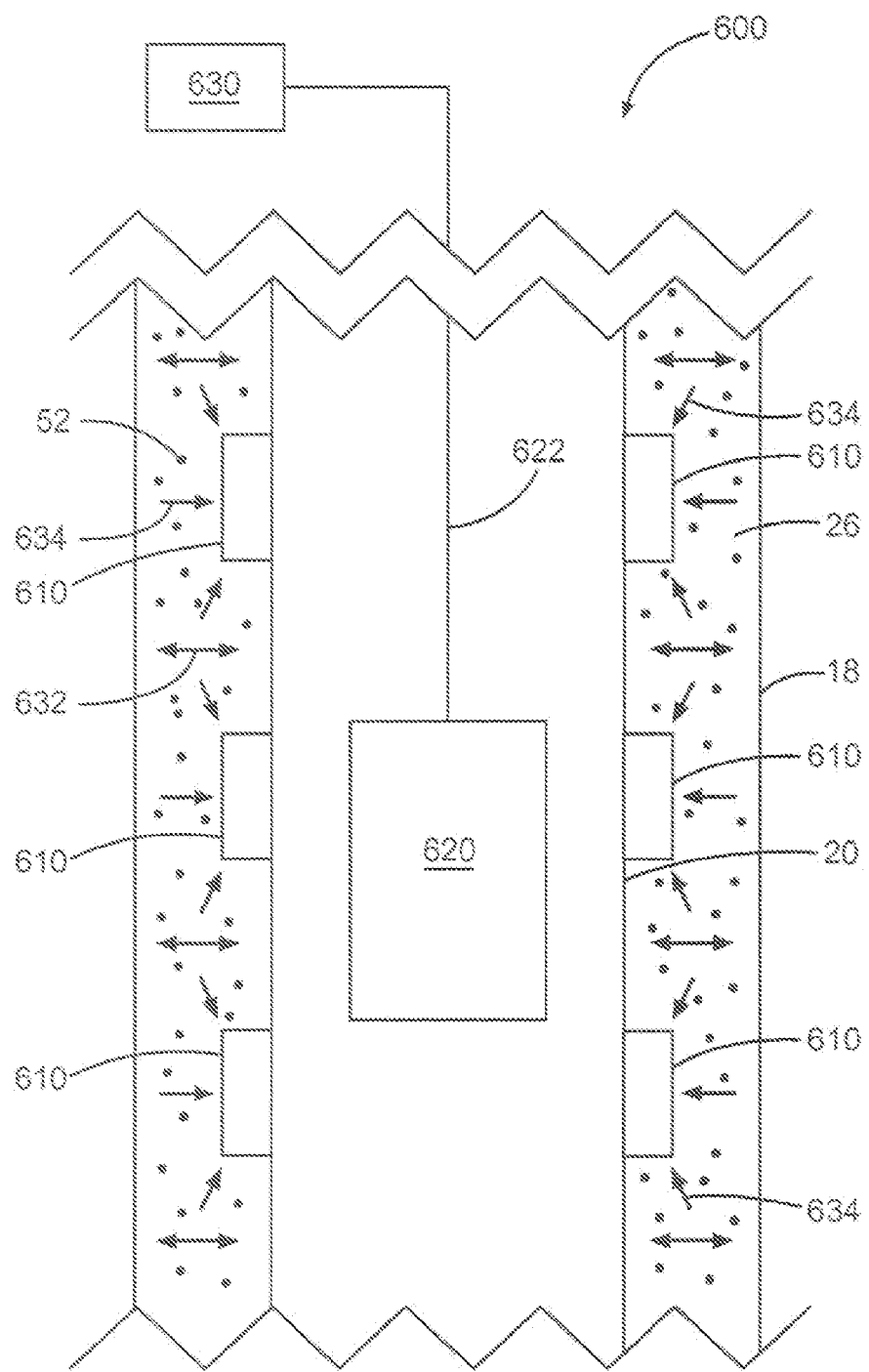
FIG. 5 is a schematic view of an embodiment of a wellbore parameter sensing system.

Referring to FIG. 5, a schematic view of an embodiment of a wellbore parameter sensing system 600 is illustrated. The wellbore parameter sensing system 600 may comprise the wellbore 18, inside which the casing 20 is situated. In an embodiment, the wellbore parameter sensing system 600 may further comprise a plurality of regional communication assembly units 610, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication assembly units 610 may be situated on or in casing collars that couple casing joints together. In addition, the regional communication assembly units 610 may be situated in an interior of the casing 20, on an exterior of the casing 20, or both. In an embodiment, the wellbore parameter sensing system 600 may further comprise a tool (e.g., a data interrogator 620 or other data collection and/or power-providing device), which may be lowered down into the wellbore 18 on a wireline 622, as well as a processor 630 or other data storage or communication device, which is connected to the data interrogator 620.

In an embodiment, each regional communication assembly unit 610 may be configured to interrogate and/or receive data from, MEMS sensors 52 situated in the annulus 26, in the vicinity of the regional communication assembly unit 610, whereby the vicinity of the regional communication assembly unit 610 is defined as in the above discussion of the wellbore parameter sensing system 600 illustrated in FIG. 5. The MEMS sensors 52 may be configured to transmit MEMS sensor data to neighboring MEMS sensors 52, as denoted by double arrows 632, as well as to transmit MEMS sensor data to the regional communication assembly units 610 in their respective vicinities, as denoted by single arrows 634. In an embodiment, the MEMS sensors 52 may be passive sensors that are powered by bursts of electromagnetic radiation from the regional communication units 610. In a further embodiment, the MEMS sensors 52 may be active sensors that are powered by batteries situated in or on the MEMS sensors 52 or by other downhole power sources.

The regional communication assembly units 610 in the present embodiment of the wellbore parameter sensing system 600 are neither wired to one another, nor wired to the processor 630 or other surface equipment. Accordingly, in an embodiment, the regional communication assembly units 610 may be powered by batteries, which enable the regional communication assembly units 610 to interrogate the MEMS sensors 52 in their respective vicinities and/or receive MEMS sensor data from the MEMS sensors 52 in their respective vicinities. The batteries of the regional communication assembly units 610 may be inductively rechargeable by the data interrogator 620 or may be rechargeable by other downhole power sources. In addition, as set forth above, the data interrogator 620 may be lowered into the wellbore 18 for the purpose of interrogating regional communication assembly units 610 and receiving the MEMS sensor data stored in the regional communication units 610. Furthermore, the data interrogator 620 may be configured to transmit the MEMS sensor data to the processor 630, which processes the MEMS sensor data. In an embodiment, a fluid containing MEMS in contained within the wellbore casing (for example, as shown in FIGS. 5, 6, 7, and 10), and the data interrogator 620 is conveyed through such fluid and into communicative proximity with the regional communication assembly units 610. In various embodiments, the data interrogator 620 may communicate with, power up, and/or gather data directly from the various MEMS sensors distributed within the annulus 26 and/or the casing 20, and such direct interaction with the MEMS sensors may be in addition to or in lieu of communication with one or more of the regional communication assembly units 610. For example, if a given regional communication assembly unit 610 experiences an operational failure, the data interrogator 620 may directly communicate with the MEMS within the given region experiencing the failure, and thereby serve as a backup (or secondary/verification) data collection option.

Figure 6:
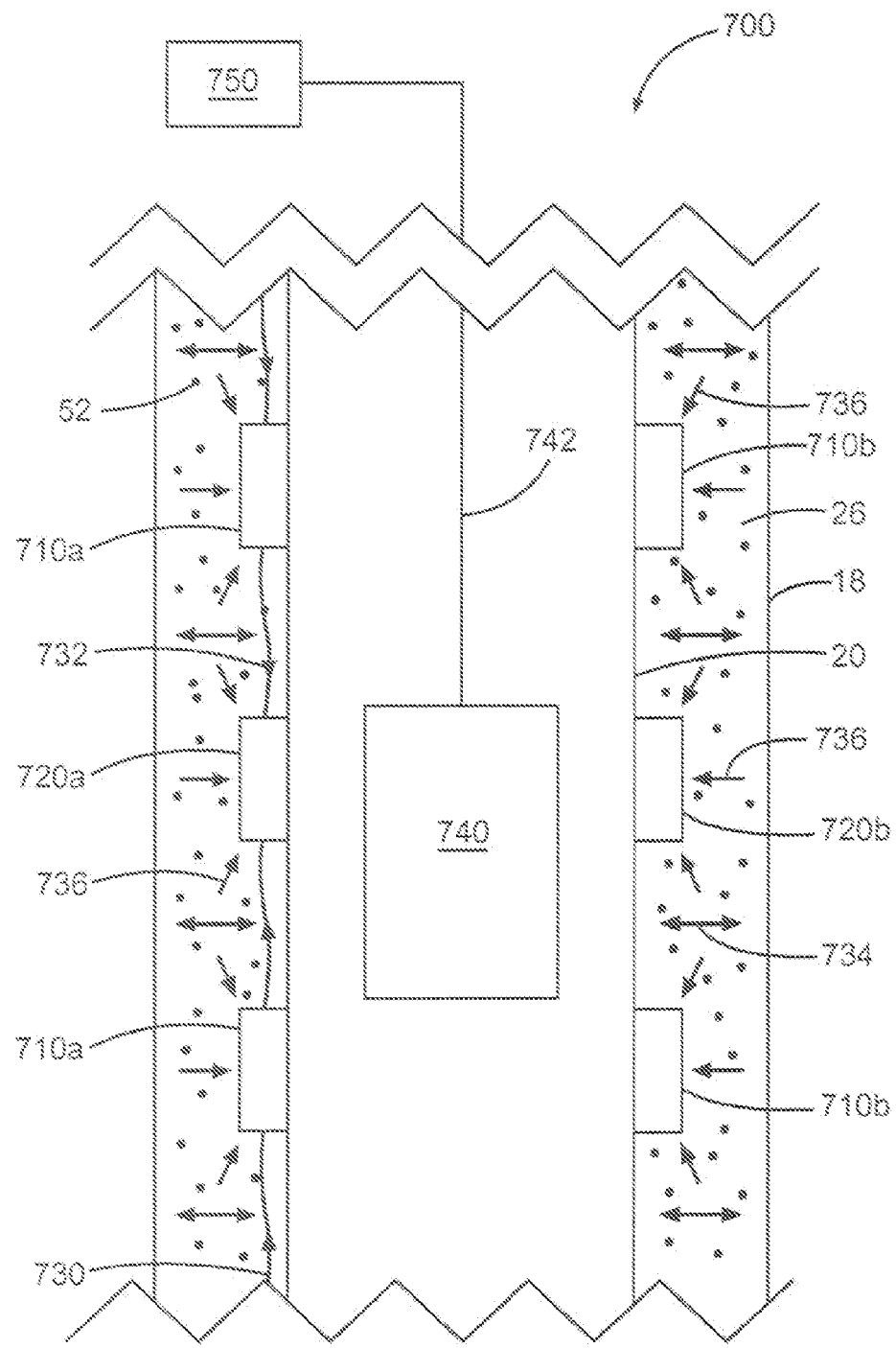
FIG. 6 is a schematic view of another embodiment of a wellbore parameter sensing system.

Referring to FIG. 6, a schematic view of an embodiment of a wellbore parameter sensing system 700 is illustrated. As in earlier-described embodiments, the wellbore parameter sensing system 700 comprises the wellbore 18 and the casing 20 that is situated inside the wellbore 18. In addition, as in the case of other embodiments illustrated in FIG. 5, the wellbore parameter sensing system 700 comprises a plurality of regional communication assembly units 710, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication assembly units 710 may be situated on or in casing collars that couple casing joints together. In addition, the regional communication assembly units 710 may be situated in an interior of the casing 20, on an exterior of the casing 20, or both, or may be otherwise located and supported as described in various embodiments herein.

In one embodiment, the wellbore parameter sensing system 700 further comprises one or more primary (or master) communication units 720. The regional communication units 710 a and the primary communication assembly unit 720a may be coupled to one another by a data line 730, which allows sensor data obtained by the regional communication assembly units 710 a from MEMS sensors 52 situated in the annulus 26 to be transmitted from the regional communication units 710a to the primary communication unit 720a, as indicated by directional arrows 732.

In an embodiment, the MEMS sensors 52 may sense at least one wellbore parameter and transmit data regarding the at least one wellbore parameter to the regional communication assembly units 710b, either via neighboring MEMS sensors 52 as denoted by double arrow 734, or directly to the regional communication assembly units 710 as denoted by single arrows 736. The regional communication assembly units 710b may communicate wirelessly with the primary or master communication assembly unit 720b, which may in turn communicate wirelessly with equipment located at the surface (or via telemetry such as casing signal telemetry) and/or other regional communication assembly units 720a and/or other primary or master communication assembly units 720a.

In embodiments, the primary or master communication assembly units 720 gather information from the MEMS sensors and transmit (e.g., wirelessly, via wire, via telemetry such as casing signal telemetry, etc.) such information to equipment (e.g., processor 750) located at the surface.

In an embodiment, the wellbore parameter sensing system 700 further comprises, additionally or alternatively, a data interrogator 740, which may be lowered into the wellbore 18 via a wire line 742, as well as a processor 750, which is connected to the data interrogator 740. In an embodiment, the data interrogator 740 is suspended adjacent to the primary communication unit 720, interrogates the primary communication assembly unit 720, receives MEMS sensor data collected by all of the regional communication assembly units 710 and transmits the MEMS sensor data to the processor 750 for processing. The data interrogator 740 may provide other functions, for example as described with reference to data interrogator 620 of FIG. 5. In various embodiments, the data interrogator 740 (and likewise the data interrogator 620) may communicate directly or indirectly with any one or more of the MEMS sensors (e.g., sensors 52), local or regional data interrogation/communication assembly units (e.g., units 310, 510, 610, 710), primary or master communication assembly units (e.g., units 720), or any combination thereof.

Figure 7:
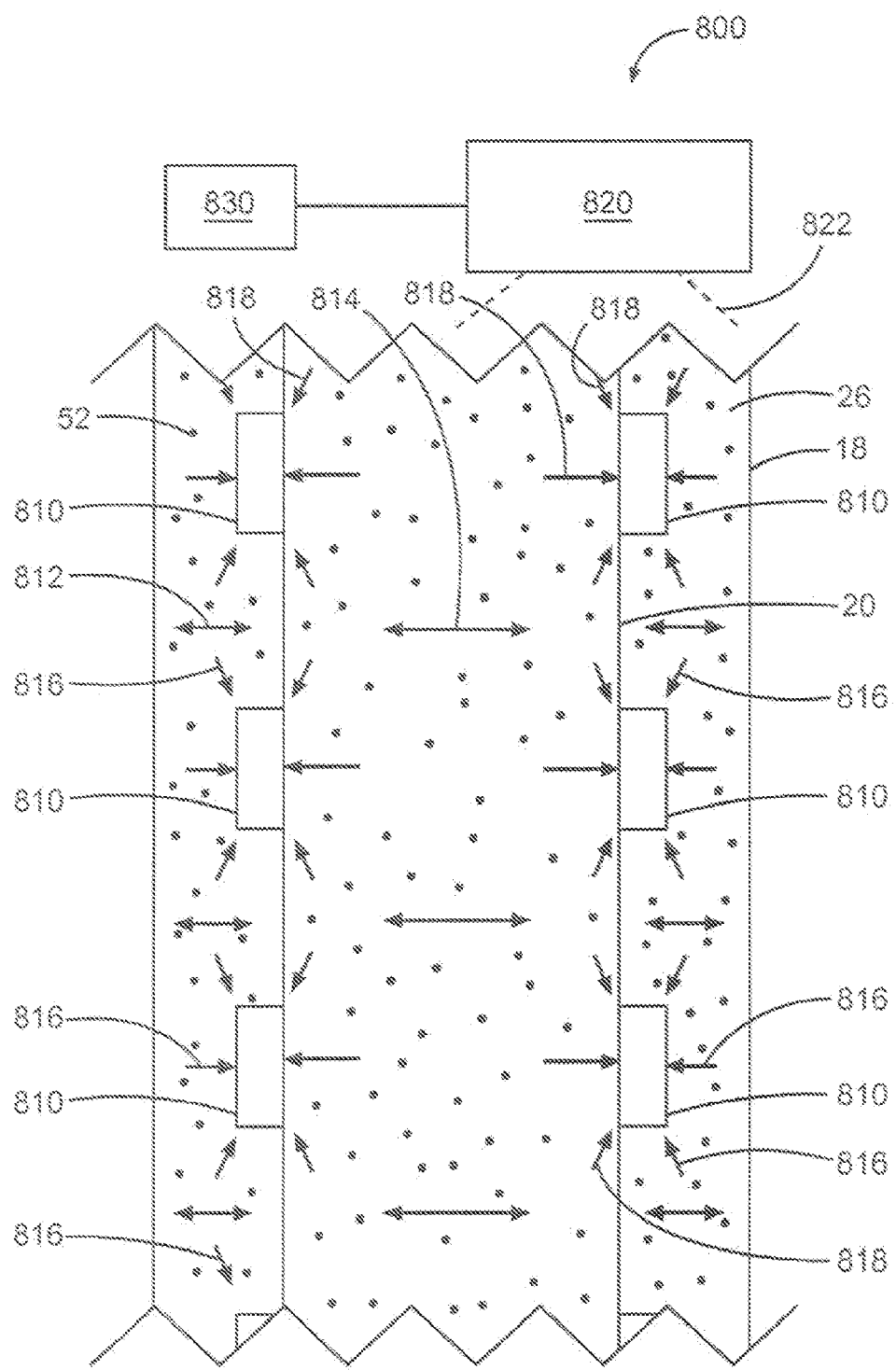
FIG. 7 is a schematic view of still another embodiment of a wellbore parameter sensing system.

Referring to FIG. 7, a schematic view of an embodiment of a wellbore parameter sensing system 800 is illustrated. As in earlier-described embodiments, the wellbore parameter sensing system 800 comprises the wellbore 18 and the casing 20 that is situated inside the wellbore 18. In addition, as in the case of other embodiments shown in FIGS. 5 and 6, the wellbore parameter sensing system 800 comprises a plurality of local, regional, and/or primary/master communication assembly units 810, which may be situated on the casing 20 and spaced at regular or irregular intervals along the casing 20, e.g., about every 5 m to 15 m along the length of the casing 20, alternatively about every 8 m to 12 m along the length of the casing 20, alternatively about every 10 m along the length of the casing 20. In embodiments, the communication assembly units 810 may be situated on or in casing collars that couple casing joints together. In addition, the communication assembly units 810 may be situated in an interior of the casing 20, on an exterior of the casing 20, or both, or may be otherwise located and supported as described in various embodiments herein.

In an embodiment, MEMS sensors 52, which are present in a wellbore servicing fluid that has been placed in the wellbore 18, may sense at least one wellbore parameter and transmit data regarding the at least one wellbore parameter to the local, regional, and/or primary/master communication assembly units 810, either via neighboring MEMS sensors 52 as denoted by double arrows 812, 814, or directly to the communication assembly units 810 as denoted by single arrows 816, 818.

In an embodiment, the wellbore parameter sensing system 800 may further comprise a data interrogator 820, which is connected to a processor 830 and is configured to interrogate each of the communication assembly units 810 for MEMS sensor data via a ground penetrating signal 822 and to transmit the MEMS sensor data to the processor 830 for processing.

In a further embodiment, one or more of the communication assembly units 810 may be coupled together by a data line (e.g., wired communications). In this embodiment, the MEMS sensor data collected from the MEMS sensors 52 by the regional communication assembly units 810 may be transmitted via the data line to, for example, the regional communication assembly unit 810 situated furthest uphole. In this case, only one regional communication assembly unit 810 is interrogated by the surface located data interrogator 820. In addition, since the regional communication assembly unit 810 receiving all of the MEMS sensor data is situated uphole from the remainder of the regional communication units 810, an energy and/or parameter (intensity, strength, wavelength, amplitude, frequency, etc.) of the ground penetrating signal 822 may be able to be reduced. In other embodiments, a data interrogator such as unit 620 or 740) may be used in addition to or in lieu of the surface unit 810, for example to serve as a back-up in the event of operation difficulties associated with surface unit 820 and/or to provide or serve as a relay between surface unit 820 and one or more units downhole such as a regional communication assembly unit 810 located at an upper end of a string of interrogator units.

For sake of clarity, it should be understood that like components as described in any of FIGS. 5-7 may be combined and/or substituted to yield additional embodiments and the functionality of such components in such additional embodiments will be apparent based upon the description of FIGS. 5-7 and the various components therein. For example, in various embodiments disclosed herein (including but not limited to the embodiments of FIGS. 5-7), the local, regional, and/or primary/master data interrogation/communication assembly units (e.g., units 310, 510, 610, 620, 710, 740, and/or 810) may communicate with one another and/or equipment located at the surface via signals passed using a common structural support as the transmission medium (e.g., casing, tubular, production tubing, drill string, etc.), for example by encoding a signal using telemetry technology such as an electrical/mechanical transducer. In various embodiments disclosed herein (including but not limited to the embodiments of FIGS. 5-7), the local, regional, and/or primary/master data interrogation/communication assembly units (e.g., units 310, 510, 610, 620, 710, 740, and/or 810) may communicate with one another and/or equipment located at the surface via signals passed using a network formed by the MEMS sensors (e.g., a daisy-chain network) distributed along the wellbore, for example in the annular space 26 (e.g., in a cement) and/or in a wellbore servicing fluid inside casing 20. In various embodiments disclosed herein (including but not limited to the embodiments of FIGS. 5-7), the local, regional, and/or primary/master data interrogation/communication assembly units (e.g., units 310, 510, 610, 620, 710, 740, and/or 810) may communicate with one another and/or equipment located at the surface via signals passed using a ground penetrating signal produced at the surface, for example being powered up by such a ground-penetrating signal and transmitting a return signal back to the surface via a reflected signal and/or a daisy-chain network of MEMS sensors and/or wired communications and/or telemetry transmitted along a mechanical conveyance/medium. In some embodiments, one or more of), the local, regional, and/or primary/master data interrogation/communication assembly units (e.g., units 310, 510, 610, 620, 710, 740, and/or 810) may serve as a relay or broker of signals/messages containing information/data across a network formed by the units and/or MEMS sensors.

Figure 8:
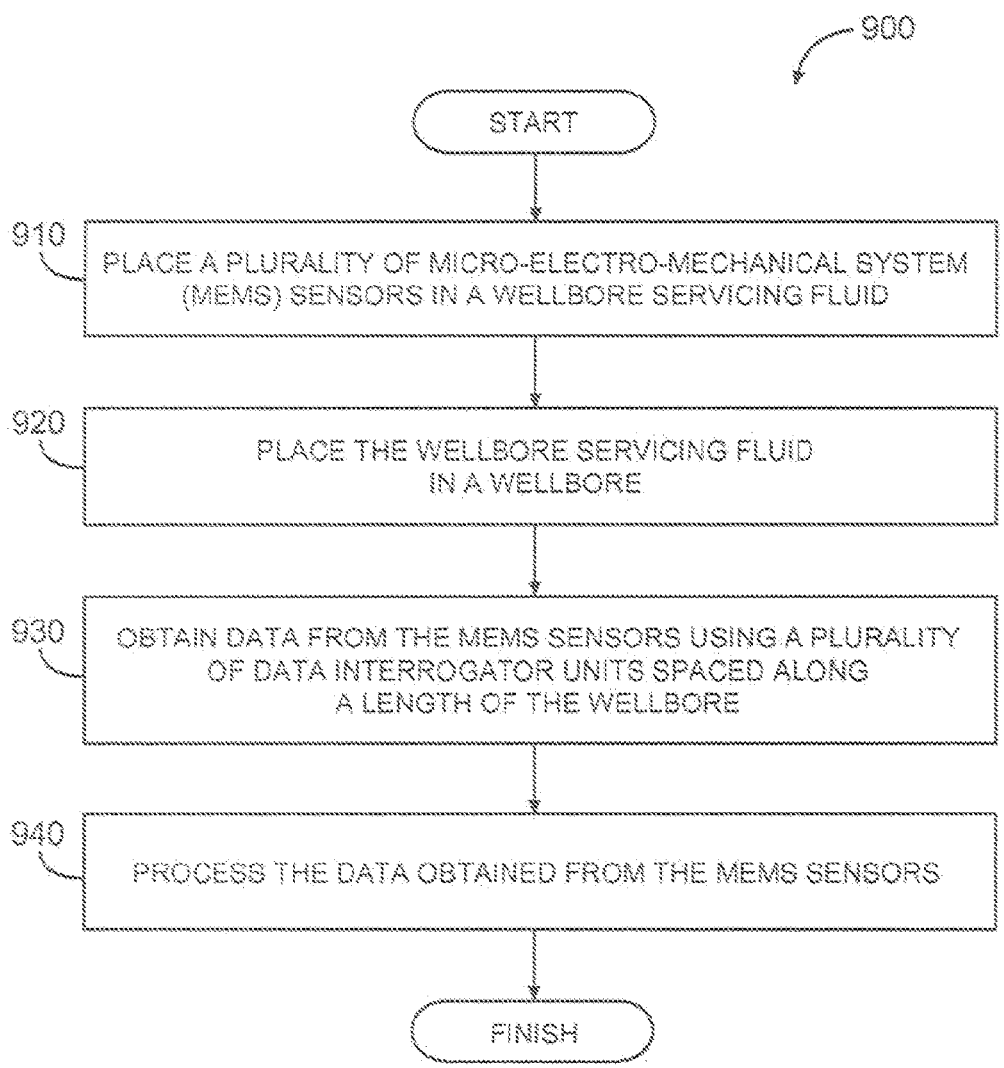
FIG. 8 is a flow chart illustrating a method for servicing a wellbore in accordance with some embodiments.

Referring to FIG. 8, a method 900 of servicing a wellbore is described. At block 910, a plurality of MEMS sensors is placed in a wellbore servicing fluid. At block 920, the wellbore servicing fluid is placed in a wellbore. At block 930, data is obtained from the MEMS sensors, using a plurality of data interrogation units spaced along a length of the wellbore. At block 940, the data obtained from the MEMS sensors is processed.

In some embodiments, a conduit (e.g., casing 20 or other tubular such as a production tubing, drill string, workstring, or other mechanical conveyance, etc.) in the wellbore 18 may be used as a data transmission medium, or at least as a housing for a data transmission medium, for transmitting MEMS sensor data from the MEMS sensors 52 and/or interrogation/communication assembly units situated in the wellbore 18 to an exterior of the wellbore (e.g., earth's surface 16). Again, it is to be understood that in various embodiments referencing the casing, other physical supports may be used as a data transmission medium such as a workstring, toolstring, production string, tubular, coiled tubing, wireline, jointed pipe, or any other physical structure or conveyance extending downhole from the surface.

Figure 9:
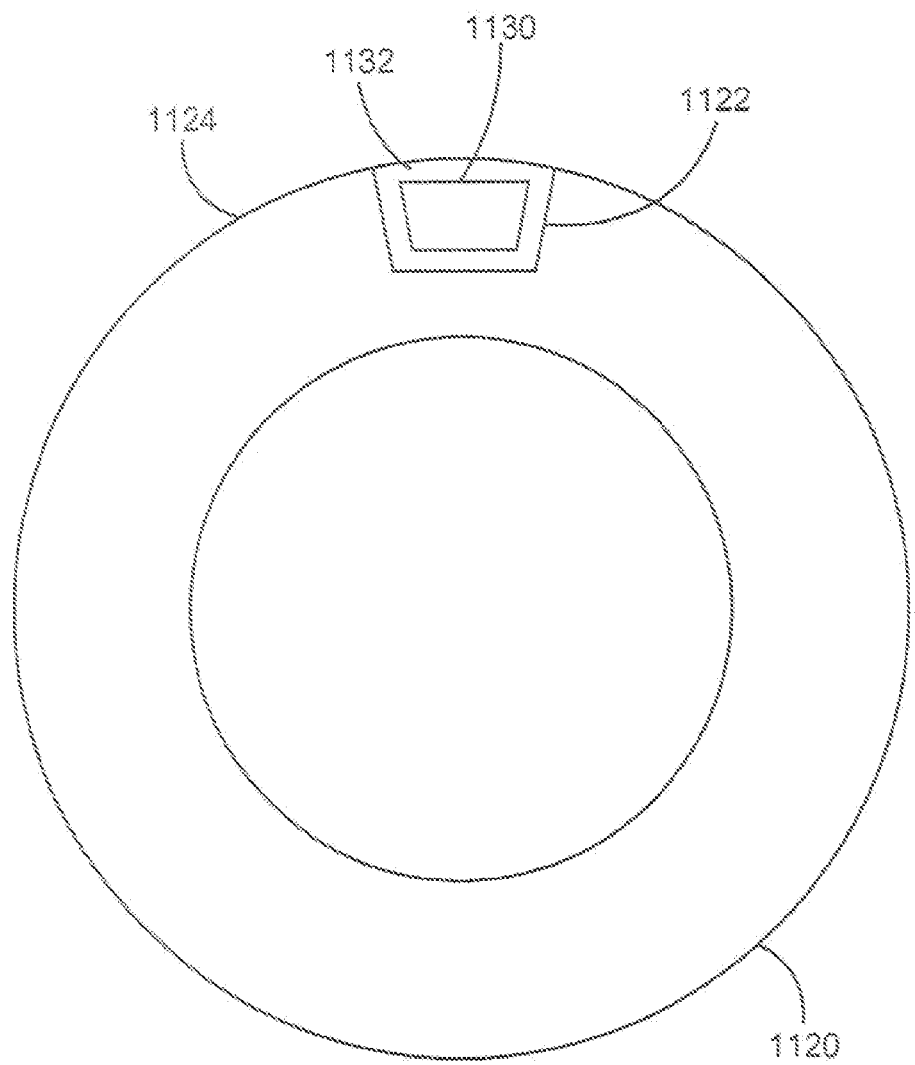
FIG. 9 is a schematic view of a further embodiment of a wellbore parameter sensing system.

Referring to FIG. 9, a schematic cross-sectional view of an embodiment of the casing 1120 is illustrated. The casing 1120 may comprise a groove, cavity, or hollow 1122, which runs longitudinally along an outer surface 1124 of the casing, along at least a portion of a length of the 1120 casing. The groove 1122 may be open or may be enclosed, for example with an exterior cover applied over the groove and attached to the casing (e.g., welded) or may be enclosed as an integral portion of the casing body/structure (e.g., a bore running the length of each casing segment). In an embodiment, at least one cable 1130 may be embedded or housed in the groove 1122 and run longitudinally along a length of the groove 1122. The cable 1130 may be insulated (e.g., electrically insulated) from the casing 1120 by insulation 1132. The cable 1130 may be a wire, fiber optic, or other physical medium capable of transmitting signals.

In an embodiment, a plurality of cables 1130 may be situated in groove 1122, for example, one or more insulated electrical lines configured to power pieces of equipment situated in the wellbore 18 and/or one or more data lines configured to carry data signals between downhole devices and an exterior of the wellbore 18. In various embodiments, the cable 1130 may be any suitable electrical, signal, and/or data communication line, and is not limited to metallic conductors such as copper wires but also includes fiber optical cables and the like.

Figure 10:
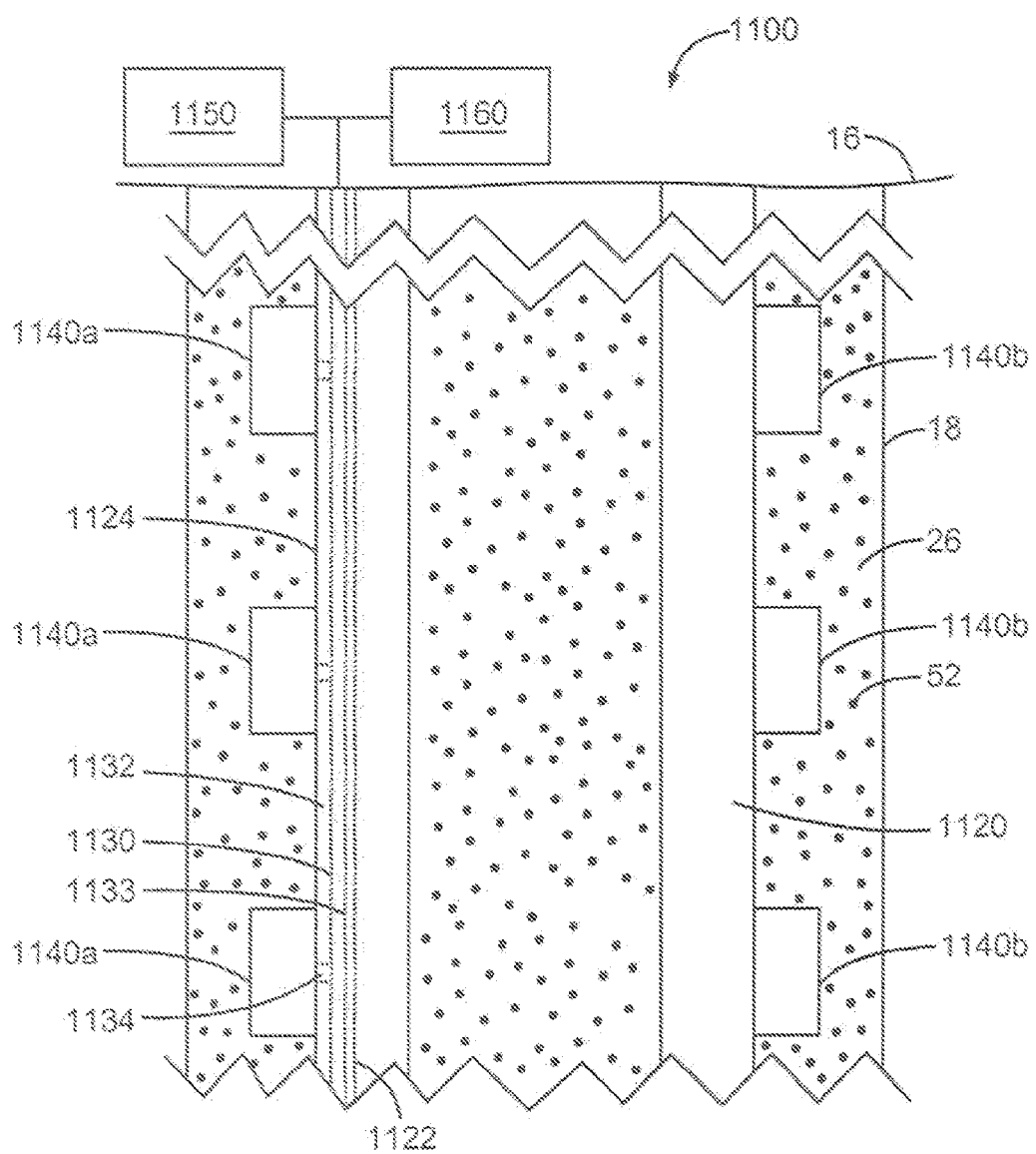
FIG. 10 is a schematic view of yet another embodiment of a wellbore parameter sensing system.

FIG. 10 illustrates an embodiment of a wellbore parameter sensing system 1100, comprising the wellbore 18 inside which a wellbore servicing fluid loaded with MEMS sensors 52 is situated; the casing 1120 having a groove 1122; a plurality of data interrogation/communication assembly units 1140 situated on the casing 1120 and spaced along a length of the casing 1120; a processing unit 1150 situated at an exterior of the wellbore 18; and a power supply 1160 situated at the exterior of the wellbore 18.

In embodiments, the data interrogation/communication assembly units 1140 may be situated on or in casing collars that couple casing joints together. In addition or alternatively, the data interrogation/communication assembly units 1140 may be situated in an interior of the casing 1120, on an exterior of the casing 1120, or both. In an embodiment, the data interrogation/communication assembly units 1140a may be connected to the cable(s) and/or data line(s) 1130 via through-holes 1134 in the insulation 1132 and/or the casing (e.g., outer surface 1124). The data interrogation/communication assembly units 1140a may be connected to the power supply 1160 via cables 1130, as well as to the processor 1150 via data line(s) 1133. The data interrogation/communication assembly units 1140a commonly connected to one or more cables 1130 and/or data lines 1133 may function (e.g., collect and communication MEMS sensor data) in accordance with any of the embodiments disclosed herein having wired connections/communications, including but not limited to FIG. 6. Furthermore, the wellbore parameter sensing system 1100 may further comprise one or more data interrogation/communication assembly units 1140b in wireless communication and may function (e.g., collect and communication MEMS sensor data) in accordance with any of the embodiments disclosed herein having wireless connections/communications, including but not limited to FIGS. 5-7.

By way of non-limiting example, the MEMS sensors 52 present in a wellbore servicing fluid situated in an interior of the casing 1120 and/or in the annulus 26 measure at least one wellbore parameter. The data interrogation/communication assembly units 1140 in a vicinity of the MEMS sensors 52 interrogate the sensors 52 at regular intervals and receive data from the sensors 52 regarding the at least one wellbore parameter. The data interrogation/communication assembly units 1140 then transmit the sensor data to the processor 1150, which processes the sensor data.

In an embodiment, the MEMS sensors 52 may be passive tags, i.e., may be powered, for example, by bursts of electromagnetic radiation from sensors of the regional data interrogation/communication assembly units 1140. In a further embodiment, the MEMS sensors 52 may be active tags, i.e., powered by a battery or batteries situated in or on the tags 52 or other downhole power source. In an embodiment, batteries of the MEMS sensors 52 may be inductively rechargeable by the regional data interrogation/communication assembly units 1140.

In a further embodiment, the casing 1120 may be used as a conductor for powering the data interrogation/communication assembly units 1140, or as a data line for transmitting MEMS sensor data from the data interrogation/communication assembly units 1140 to the processor 1150.

Figure 11:
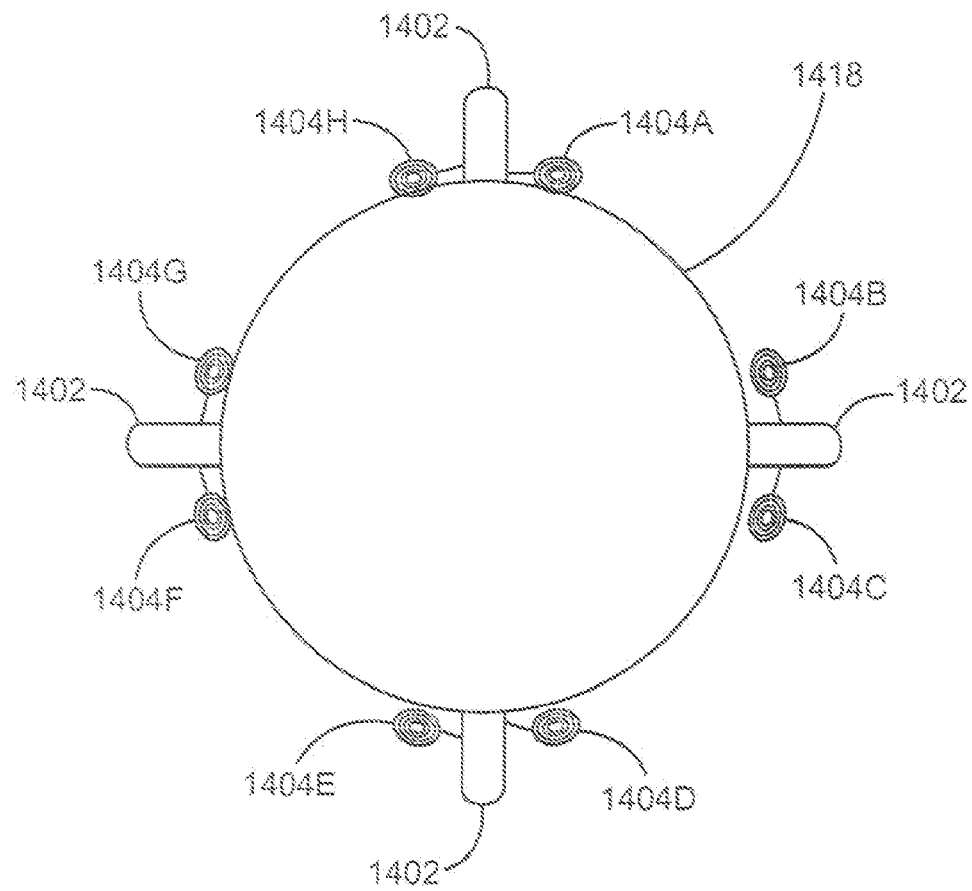
FIG. 11 is a cross-sectional view of a communication assembly in accordance with some embodiments.

As noted above regarding FIGS. 1 and 3-4, it can be advantageous to determine the progress or possible completion of a sealing (or "cementing") operation, which can be accomplished by taking measurements along the casing string of the location and progress of the "top of cement" (TOC). It can also be advantageous to monitor the quality of sealant as a barrier, which includes the adequacy of the distribution of sealant throughout the annulus between the casing and the formation. FIG. 11 is a cross-sectional schematic view of an example communication assembly 1400 as may be used to measure the sealant (or other well servicing fluids) present within different azimuthal regions of the annulus. Communication assembly 1400 is discussed below with reference to some elements depicted in FIG. 5-7.

The example communication assembly 1400 includes a plurality of ribs 1402 that extend longitudinally along the assembly and in spaced relation to one another around the periphery of the assembly. In many examples, ribs 1402 will be hollow and will house control circuitry or other electronics, for example, voltage-controlled oscillators, memory, analog RF circuitry, sensors, power systems, processors, and other circuitry to enable communication with an external location, etc.

In one embodiment, the ribs 1402 will further include interrogation circuitry suitable for generating signals to both interrogate RFID tags (which may include additional MEMS sensor components, as described earlier herein) and to receive signals from those interrogated RFID tags. Such signals will be communicated to one or more antennas 1404 operatively coupled to each instance of such interrogation circuitry). An instance of interrogation circuitry with at least one antenna will form an "RFID sensor assembly" for sensing the presence of RFID tags, and any additional information obtained when the RFID tags are interrogated (such as sensor data). In one embodiment, interrogation circuitry within rib 1402, can interrogate the RFID tags by scanning through a range of possible tag frequencies.

Figure 12A:
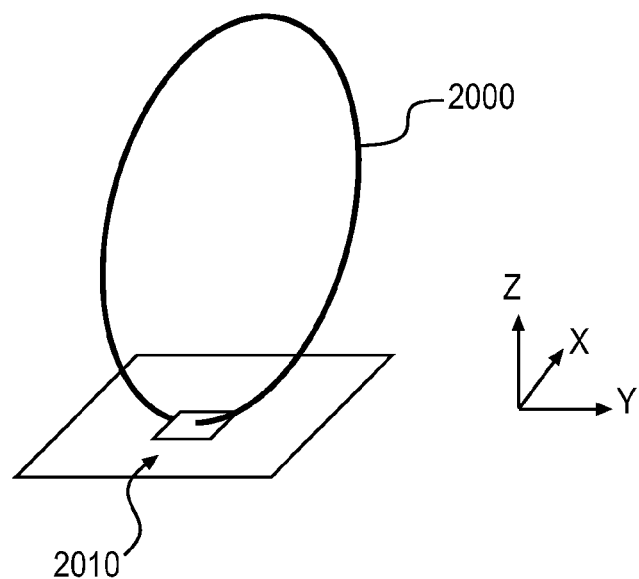
FIG. 12A is a schematic view of a single lobe sensor according to some embodiments.
Figure 12B:
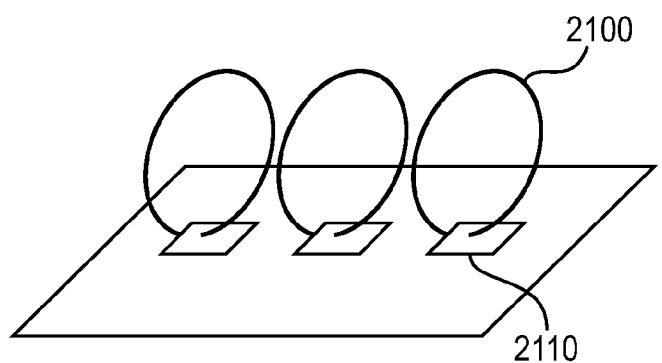
FIG. 12B is a schematic view of a multi-lobe sensor according to some embodiments.

According to an embodiment, the interrogation circuitry may include a sensor configurable to control the area of sensitivity. More particularly, the configurable sensor may have extended azimuthal or longitudinal coverage. As seen in FIG. 12A, a single sensor 2010 includes a single sensor coil. The pattern of sensitivity is shown as the lobe pattern 2000. One may determine that the gain is distributed in an undesirable pattern since the pattern may, for example, extend a distance away from the sensor in the z-direction, but not cover much distance across the sensor in the x-y direction. Accordingly it has been discovered that the use of multiple sensor coils in a single sensor can redirect and tune the sensitivity of the sensor. In one embodiment, sensors 2110, as shown in FIG. 12B, represent a pattern of equal sensitivity to the single lobe of FIG. 12A, but the sensitivity pattern is distributed in a more desirable wider pattern as shown by the lobes 2100. Here, the plurality of sensor coils produce a set of lobes that provide a wider sensitivity pattern over the x-y surface of the sensor allowing a tag near any of the three sensor coils to cause the characteristic drop in transmitted power at the tags center frequency.

The sensor as described can have from two sensor coils to about twenty sensor coils. According to one embodiment, the sensor has at two sensor coils, for example, at least three sensor coils, for example, four sensor coils, for example, from two coils to five coils. The skilled artisan would recognize that the placement and number of sensor coils can be adjusted to improve the efficiency of measurement and to shape the field pattern, thus resulting in the desired tag sensitivity. Further, the skilled artisan would recognize that impedance matching elements may be used to reduce noise and minimize signal reflection.

As the number of coils changes, it will apparent to the skilled artisan that the order of the filter can be changed. Appropriate filters can include any number of components, for example, the filter can be a third, fourth, fifth or sixth order filter or can go as high as a fifteenth or eighteenth order filter.

Figure 13A:
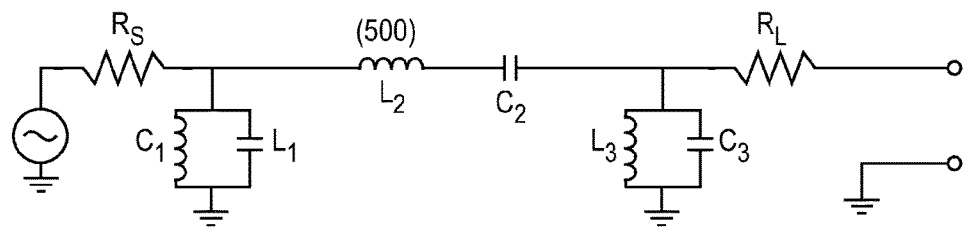
FIG. 13A is a circuit diagram according to some embodiments.
Figure 13B:
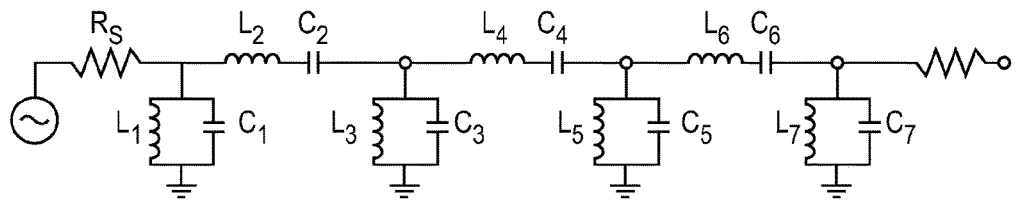
FIG. 13B is a circuit diagram according to other embodiments.

In one embodiment as represented by the circuit diagram of FIG. 13A, each sensor coil shown in FIG. 12B can be driven independently, allowing for fine resolution of the tag location. In this embodiment, the sensor coil is found at the L2 inductor, represented as 500. In another embodiment as represented by FIG. 13B, all of the sensors of FIG. 12B can be driven with a single circuit. Such a design may provide desirable component count reduction or power reduction.

FIG. 13B, like FIG. 13A, uses a band pass filter topology, but represents a higher order. According to this embodiment, the sensors each have a sensor coil as an inductor which results in a seventh order topology as seen if FIG. 13B. The sense coils are at L2, L4 and L6.

Other suitable filter topologies will be readily apparent to the skilled artisan and can include Cauer topologies, for example, a Chebyshev filter or an elliptical filter, depending upon the application. According to one embodiment, the sensor can have a Butterworth filter topology, which has the benefit of having a maximally flat response. Butterworth filters have a monotonically changing magnitude function, unlike other filter types that have non-monotonic ripple in the passband and/or the stopband. For this topology, the relative values of L2, L4 and L6 are 1.2470, 2.0000, and 1.2470, respectively.

The sensor as described can be used in the frequency range of from about 300 MHz to about 750 MHz. Multi-coil sensors as described herein may be used in the RFID sensor assembly as described and can sense both the RF signal and the MEMS directly.

The multiple coils 2110 are collectively or individually coupled to a matching circuit (not shown). The matching circuit can for example, include the additional electrical structures as shown in FIGS. 13A and 13B. Other arrangements of resisters, capacitors, inductors etc. are contemplated within the instant disclosure.

The interrogation circuitry will be configured to determine a location of the tag with respect to the antennas or by evaluating the amplitude of a signal reflected from the tag and/or triangulation through interrogation of a tag by multiple RFID sensor assemblies. In many of these example implementations it will be preferable that the RFID tags each have a unique tag ID, enabling the tag to be individually distinguished. In such systems, interrogation circuitry within rib 1402 can be configured detect azimuthal direction of a tag based on a transmission pattern or amplitude of a reflected signal between a tag and one or more antennas 1404. Therefore, the nature or type of fluid in which tags are disposed can again be detected at different azimuthal directions relative to communication assembly 1400 and casing 20.

As another example, tags may be interrogated though an RFID sensor assembly using a single antenna to both send interrogation signals to RFID tags and receive response signals from such tags. In other examples, an RFID sensor assembly may be configured to use two antennas, one for transmitting the interrogation signals and the other for receiving the response signals. Each RFID sensor assembly (as defined below), includes at least one antenna and the identified interrogation circuitry; however, each RFID sensor assembly will not necessarily include a discrete instance of the interrogation circuitry. For example, the interrogation circuitry can be configured to send/receive signals through multiple antennas, or through multiple pairs of antennas (depending on the RFID sensor assembly configuration). As will be apparent to persons skilled in the art, this functionality can be achieved through multiple mechanisms, for example, such as time shifting signals communicated to each antenna, or pair of antennas. In other words, in some examples, multiple RFID sensor assemblies may share a single physical instance of interrogation circuitry.

Accordingly, each antenna (in a single antenna send/receive assembly), or each pair of antennas (in a dual antenna send-receive assembly) used to communicate with RFID tags will be referred to as a "RFID sensor assembly" herein, with the understanding that the antennas will be operably coupled to a discrete or shared instance of interrogation circuitry to form the complete RFID sensor assembly. As will be apparent to persons skilled in the art, the location and orientation of the antenna(s) will in substantial part control the area interrogated by the RFID sensor assembly. Therefore, the location of each single antenna or pair of antenna operated by the interrogation circuitry to interrogate RFID tags will be identified as the "location" of the RFID sensor assembly, notwithstanding that the associated interrogation circuitry may be placed at a different physical location.

The various electronic circuits within each rib 1402 can be configured to communicate as desired with circuitry in another rib 1402. Such communications can occur through use of any suitable mechanism as will be apparent to those skilled in the art, for example, through use of a serial peripheral interface (SPI), though embodiments are not limited thereto.

Figure 14:
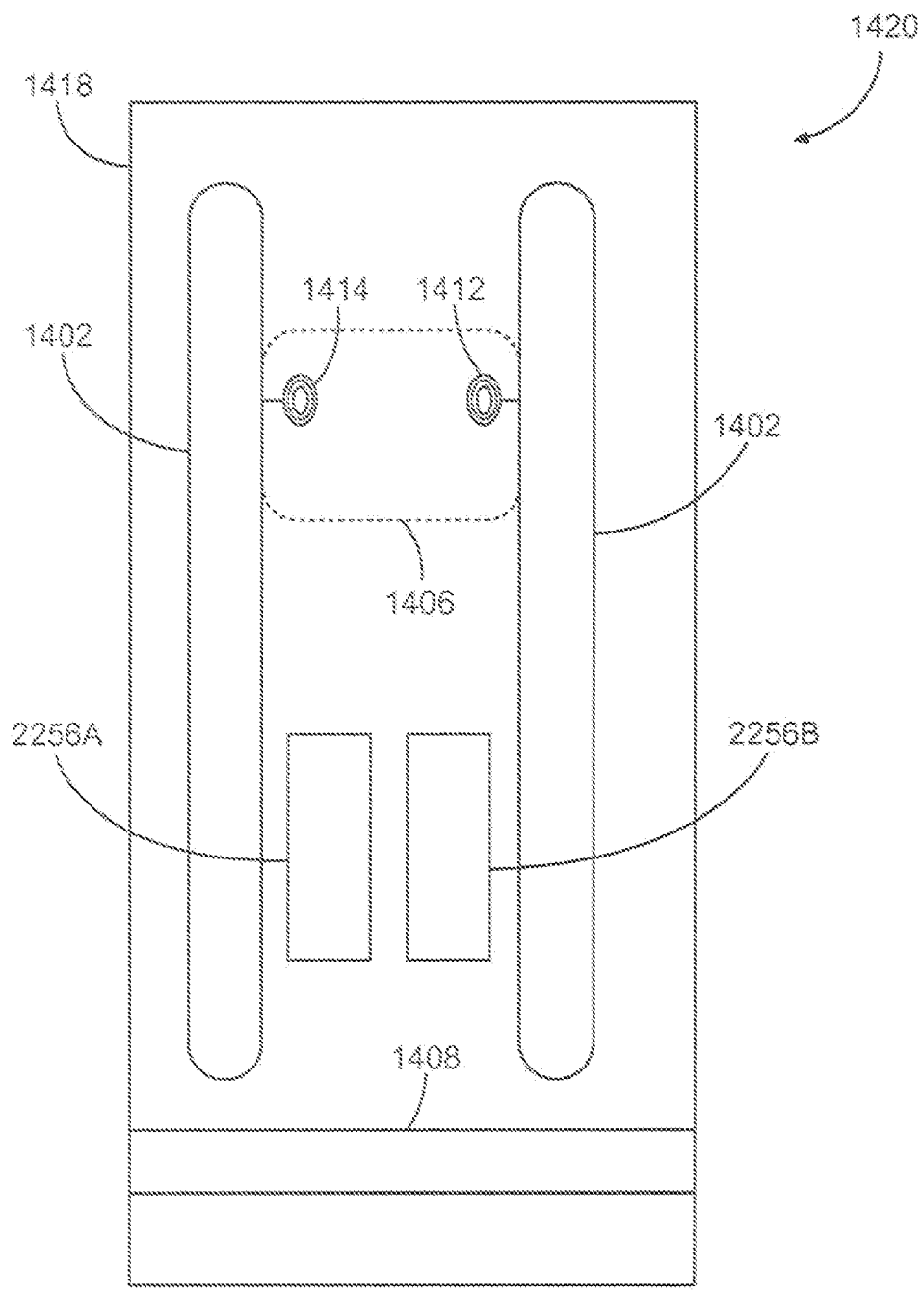
FIG. 14 is a side view of a communication assembly in accordance with a first embodiment.

Communication assembly 1400 can be configured to be associated with the casing string by a variety of mechanisms. Each communication assembly includes a body member 1418 supporting other components and facilitating association with the casing string. In some embodiments, communication assembly 1400 will include a sleeve body member configured to concentrically engage the outer diameter of a length of casing. In such cases, the sleeve body member can be placed over a length of casing before it is incorporated into the casing string 20, and then secured in place by an appropriate mechanism. As one example, the sleeve body member may be secured against the upset at the box end of the casing section and then clamped in place. In other examples, communication assembly 1400 can include a body member configured as a specialized section of casing 20, which either includes ribs 1402 as depicted in FIG. 14, or provides recesses or other structures to house the described components, and configured to be threadably inserted into the casing string 20. In yet another alternative, communication assembly 1400 can have a supporting body member configured as a hinged clamshell (or a two part assembly) that can be secured around a length of casing, without either having to be joined into the casing string or the casing having to be inserted through the body member, as with the above alternative examples.

One consideration in the configuration of communication assembly 1400 will be the structures used for communicating information from the communication assembly. In some examples where communication is through wireless RF communication, the communication assembly may include either a toroidal coil with a core extending circumferentially to the assembly (and casing), or a solenoid coil with windings extending circumferentially around the assembly (and casing string) to transmit the communication signals. Such assemblies may be more difficult to implement in either a clamshell or a multi-section form, relative to solid body member configurations such as the above examples.

Referring again to FIG. 11, example communication assembly 1400 includes four ribs 1402 generally equally spaced around assembly, and therefore equally spaced relative to the circumference of casing 20. As will be apparent to persons skilled in the art having the benefit of this disclosure, either a greater or lesser number of ribs may be utilized as desired for particular application. In the depicted schematic representation, a pair of antennas is provided between each pair of adjacent ribs 1402 to sense RFID tags contained within fluid passing by communication assembly 1400 in the well annulus. In the depicted example, the RFID sensor assemblies are presumed to be of a dual antenna configuration, and thus each pair of antennas between ribs, 1404 A-B, 1404 C-D, 1404 E-F and 1404 G-H, is intended to form a respective RFID sensor assembly under the definition provided above. In other examples, each antenna may represent a separate RFID sensor assembly. Because of the dual antenna RFID sensor assembly configuration assumed in communication assembly 1400, each RFID sensor assembly will interrogate RFID tags within a respective azimuthal quadrant of the annulus surrounding communication assembly 1400 in a well. Any number of ribs, or corresponding structures, may be provided as necessary to house the necessary circuitry, and as desired to provide interrogation within a determined azimuthal region surrounding communication assembly 1400. It should be clearly understood that azimuthal detection is not limited to space between the ribs (or corresponding structures). In some examples, RFID sensor assemblies may be located to sense "across" each rib to maximize azimuthal sensing of the annulus.

Each RFID sensor assembly will generally be configured to detect within a determined azimuthal region of the annulus. In some implementations, these azimuthal regions may all be distinguished from one another, while in others the azimuthal regions may partially overlap with one another. Additionally, each communication assembly may provide multiple longitudinally offset RFID sensor assemblies, providing redundant sensing within a given azimuthal region. Of course, in many contemplated configurations, multiple communication assemblies longitudinally disposed along the casing string will measure corresponding azimuthal regions as other communication assemblies, albeit at different depths within the borehole.

For the present example, communication assembly 1400 includes four RFID sensor assemblies, as noted above. However, additional ribs may be provided, and may be used to support additional antennas in desired orientations; and/or additional RFID sensor assemblies might be longitudinally offset along communication assembly 1400 relative to those depicted in FIG. 11. Additionally, as discussed below, each communication assembly can include one or more sensors of types other than RFID sensors. Examples (as described later herein), include acoustic sensors, temperature sensors, etc. In many (but not all) examples, these additional sensors will also be arranged to sense parameters in a selected azimuthal region of the annulus surrounding the communication assembly. In the case of some types of sensors, it may be determined that only a single measurement is need proximate a given depth, and thus only a single additional sensor of a selected type may be used, rather than multiple azimuthally sensitive sensors of that type. As with the RFID sensor assemblies, in many embodiments of such systems, the circuitry associated with such additional sensors (for control, receiving, and/or processing of data from the sensors), and in some cases, the entire sensor itself, will be housed within one or more of ribs 1402.

Figure 15:
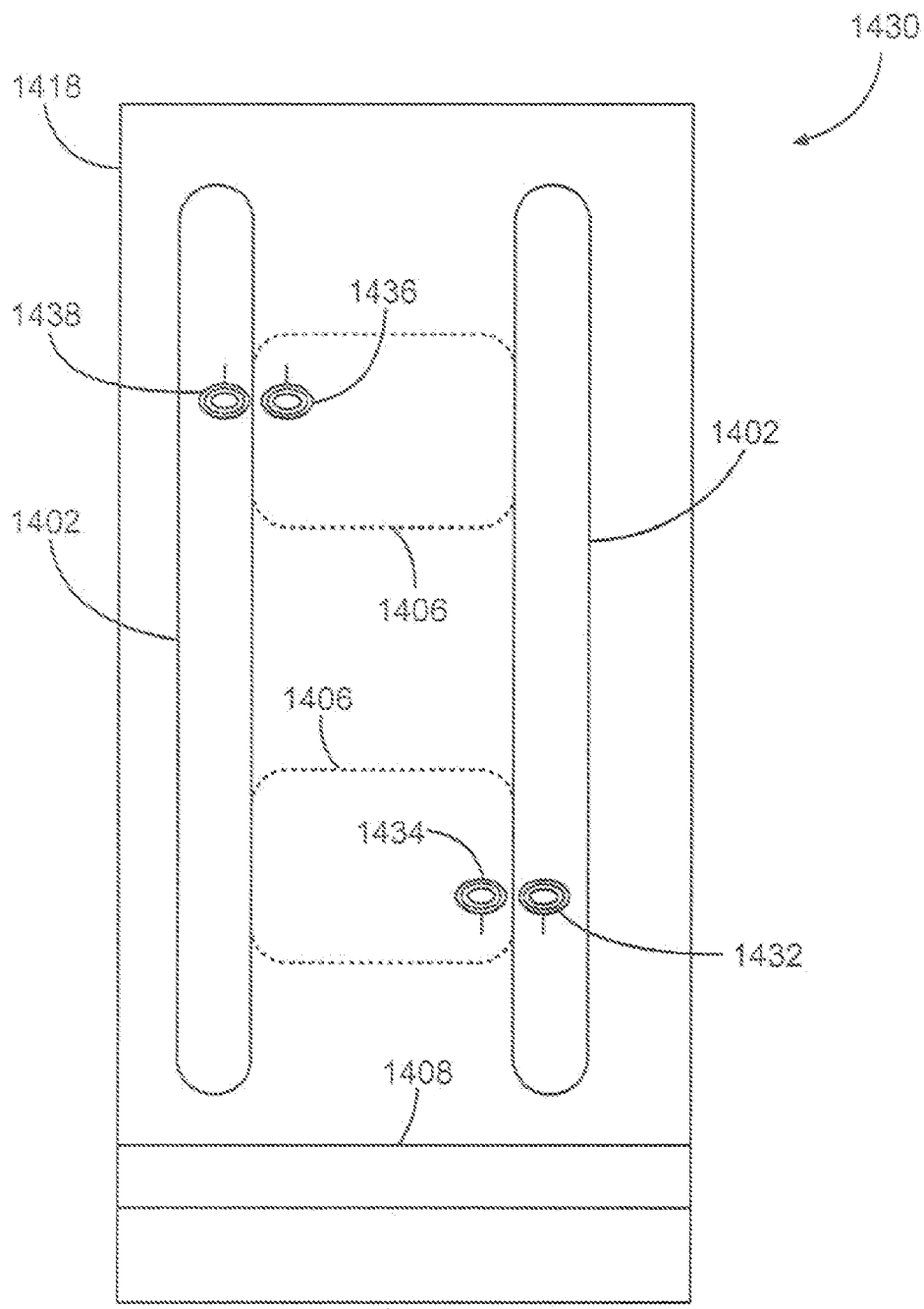
FIG. 15 is a side view of a communication assembly in accordance with a second embodiment.

Referring now to FIGS. 14-16, these figures each depict a side view of a respective example of a communication assembly 1420, 1430, 1440, respectively. Components comparable to those discussed relative to FIG. 14 are numbered similarly in FIGS. 12-14. In the depicted examples, each communication assembly 1420, 1430, 1440, includes a plurality of antennas arranged to provide a plurality of RFID sensor assemblies, though only one side of each communication assembly is shown. Accordingly, it should be understood that the described structures would be replicated at a plurality of azimuthally offset locations around each communication assembly 1420, 1430, 1440. Each antenna 1404 can be configured as a loop, dipole, etc., as desired. For the present examples, the antennas 1404 are each depicted as a loop antenna, again in a dual antenna RFID sensor assembly configuration. Each antenna may be oriented on the respective communication assembly 1420, 1430, 1440, as desired to orient the field of the antenna in a desired direction.

Depending upon the specific materials of construction of various portions of a respective communication assembly, antennas may be secured proximate a metallic surface. In such cases, the antennas can be mounted on a dielectric material 1406 to prevent electrical shorts against such metallic surfaces of the communication assemblies. In many cases, this dielectric material can be of any type generally known to persons skilled in the art for electrically isolating and protecting electrical components within downhole tools. For example, a material such as Protech DRB™ or Protech CRB™, available from the Halliburton Company of Houston, Tex. can be used as a suitable dielectric material 1406. In general, the dielectric material is one capable of providing a necessary degree of mechanical protection for the covered components, while providing a high resistance to DC current, but a low electrical loss factor to signals in the 10 MHz to 1 GHz range. The same dielectric material 1406, or another suitable material, can be disposed over antennas 1404 to protect them from the harsh environment within a borehole, including risk of abrasion, chemically induced deterioration, etc.

As noted above, in the dual antenna configuration of the RFID sensor assemblies, one antenna 1404 of a pair will transmit RF signals to interrogate RFID tags from one antenna and the other antenna 1404 of the pair will be used to receive signals generated from the RFID tags in response to the interrogation signal. A compatible RFID tag (not shown in FIG. 12) passing in the field between the pair of antennas 1404 will generate a change in the transmission pattern between antennas 1404 in response to the interrogation signal.

The multi-coil circuitry approach as described herein provides the ability to manipulate and change the range and area of detection. So while the interrogation range of the antennae might remain unchanged, the selection of certain multi-coil circuit arrangements can change the detection zone within which a MEMS will be observed. For example, assuming that the sensing assembly observes MEMS in an elliptical area, the change to a multi-coil system could change the nature of the ellipse, for example, from broad to narrow.

In the dual antenna RFID sensor assembly configuration as described earlier, the antennas can be arranged such that they define a generally known region of investigation for the respective RFID sensor assembly. In the example of communication assembly 1420 of FIG. 12, antennas 1412 and 1414 can be oriented to provide a region of investigation extending generally between the adjacent ribs 1402. As a result, the RFID sensor assembly with antennas 1412 and 1414 will investigate approximately a quadrant of the annulus surrounding communication assembly 1420, up to a maximum depth of investigation as determined by the specific implementation.

Monitoring the number of tags identified by that RFID sensor assembly provides an indication of the volume of fluid in which those RFID tags are carried proximate the quadrant investigated by the RFID sensor assembly. In other configurations, such as single antenna RFID sensor assemblies, the location of the antenna, in combination with an experimentally determined region of investigation, can again provide a measure of fluid within azimuthal region of investigation of the RFID sensor assembly. In these types of measurements, the primary concern is as to the number of tags within an identifiable region rather than the placement of any individual tag. Such a system can be implemented with relatively basic passive RFID tags that merely respond to an interrogation rather than transmitting a tag ID or other information.

Many possible arrangements of antennas are contemplated, and the described system is not limited to any particular configuration of antennas. The number, arrangement and spacing of antennas can be adjusted based on, for example, power needs, performance requirements, or borehole conditions.

As noted above, the communication assemblies may include a coil that extends in either a toroidal or solenoid form concentrically to the casing to facilitate wireless communication of obtained data. An example coil 1408 is depicted in each of communication assemblies 1420, 1430, 1440, 1450.

Referring now to FIG. 15, the figure depicts an alternative configuration of the communication assembly 1430. Communication assembly 1430 includes an RFID sensor assembly including one antenna 1432 oriented along one rib 1402, with a paired antenna oriented at an angle such as by being placed generally in a plane tangential to body member 1408 of the communication assembly (i.e., in this example extending generally in parallel to a tangent of the underlying casing string). In this example, a second similarly arranged RFID sensor assembly having a pair of antennas 1436, 1438 is included at a longitudinally offset location along body member 1408.

Figure 16A:
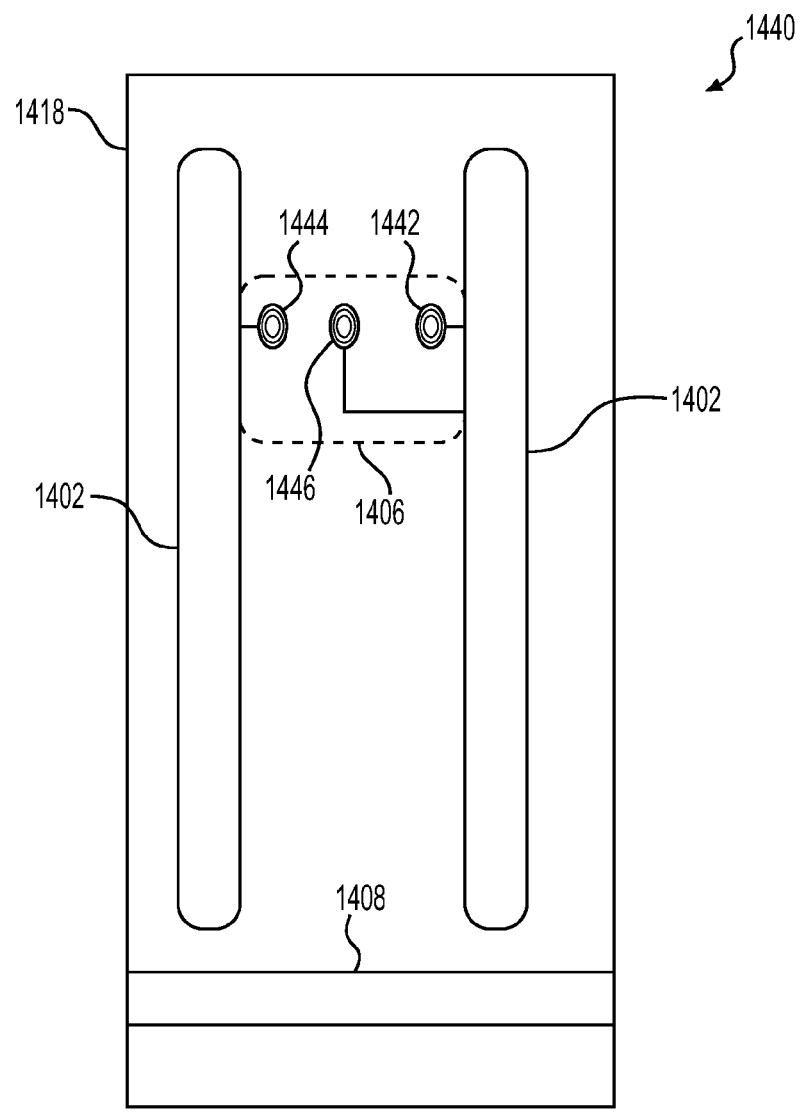
FIG. 16A is a side view of a communication assembly in accordance with a third embodiment.

FIG. 16A depicts an alternative configuration of a communication assembly 1440 in which an antenna 1446 is placed in a generally central location between two ribs 1402 to serve as either a transmit or receive antenna relative to a pair of nearby antennas 1442, 1444. Antennas 1442, 1444 may be mounted, for example, on the adjacent ribs 1402, and configured to perform the opposite transmit/receive function. Thus, the central antenna 1446 is shared by two RFID sensor assemblies each having antenna 1442 or 1444 as the other antenna. In some implementations, this configuration may serve to provide increased certainty of investigation across an azimuthal region of the surrounding annulus.

Figure 16B:
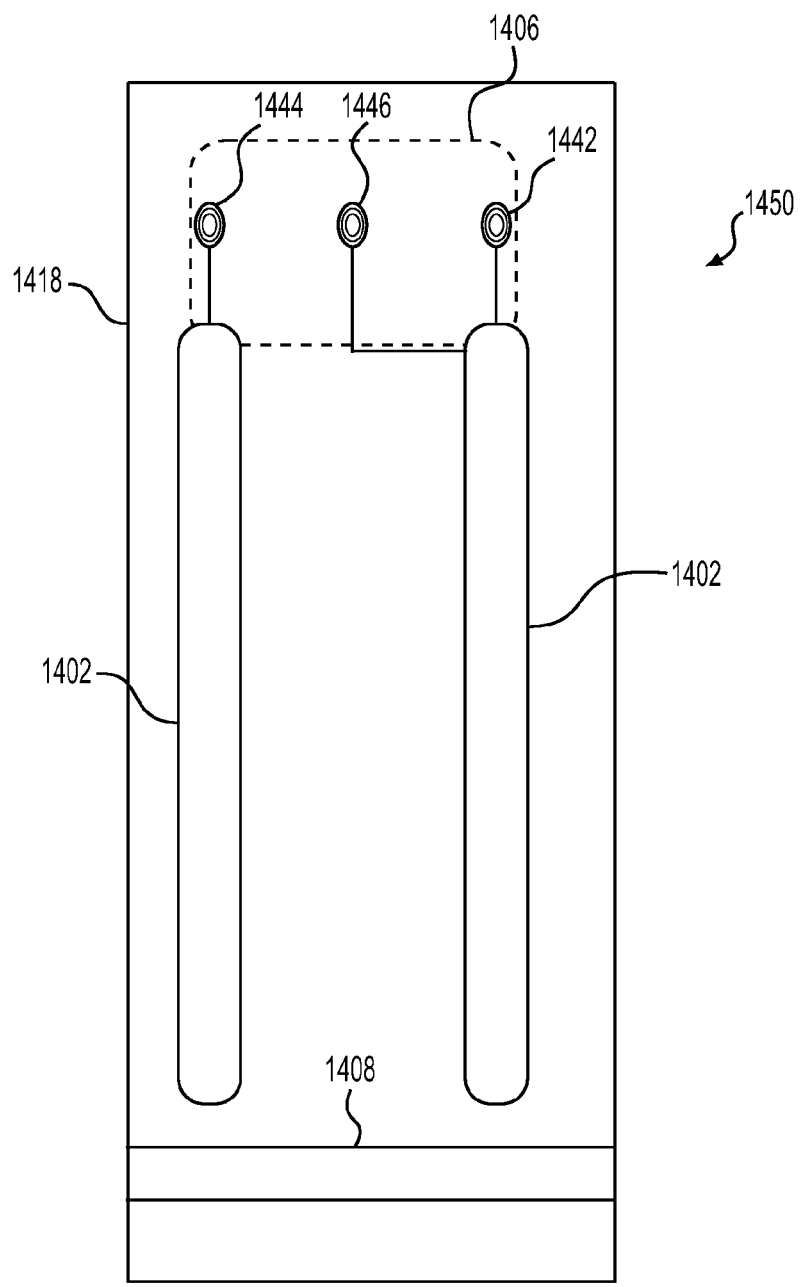
FIG. 16B is a side view of a communication assembly in accordance with a fourth embodiment.

FIG. 16B depicts an alternative configuration of a communication assembly 1450 in which an antenna 1446 is placed in a generally central location between two ribs 1402 to serve as either a transmit or receive antenna relative to a pair of nearby antennas 1442, 1444. Antennas 1442, 1444 are mounted, for example, on the end of ribs 1402, and configured to perform the opposite transmit/receive function. Thus, the central antenna 1446 is shared by two RFID sensor assemblies each having antenna 1442 or 1444 as the other antenna.

As is apparent from the discussion above, in many example systems, a plurality of communication assemblies (or communication units) will be disposed in longitudinally-spaced relation to each other along the casing 20, at least over a region of interest relative to either the sealing operation or to other downhole conditions.

As previously described regarding at least FIG. 1, a location, in particular a top location, of the sealant (i.e., generically referred to as "top of cement," or "TOC") can be determined by finding a location on casing string 20 where below it, primarily only tags associated with the sealant are identified, while above the location, only tags associated with other fluids, for example spacer fluid or drilling mud, are identified. It will be understood there may be some mixing due to irregularities in the formation sidewalls that will trap some of the tags and possibly their associated fluids from the spacer and mud pumped through annulus 26. Therefore, some tags associated with one type of fluid may become mixed with a different type of fluid than that indicated by the tag type.

Each communication assembly will preferably include an azimuthal indicator, for example a compass, to determine the orientation of the communication assembly once it is disposed within the borehole. With a known orientation of the communication assembly, the orientation of each rib and/or RFID sensor assembly will be known and therefore the quadrant or other azimuthally offset region being investigated will similarly be known. The depth of each casing assembly can be known, for example through a record of the location of each communication assembly as it is associated with the casing string 20 as the string is placed in the wellbore, providing a measure of depth as to the surface.

In different examples, TOC measurement can be done after the pumping of the sealant is completed or the measurement can be a dynamic measurement of the TOC while the sealant is moving up annulus 26. The other measurements described herein facilitate measurements not only of the TOC, but also of the distribution of the cement or other sealant around the casing over the region of the casing string that includes associated communication assemblies. Regions where a minimal number of tags of the type entrained within the sealant are located indicate a region where, for some reason, sealant has been blocked from reaching the region, or has reached the region in a relatively limited volume. Identifying both the depth and orientation where this occurs facilitates remediation efforts Each communication assembly 1400 can report information associated with the sensed tags to a surface system, for example surface system 630, using communication methods described above regarding FIG. 5-7. In some examples, this may be as basic as a number of tags sensed within a given time interval, grouped or formatted in a manner to indicate the azimuthal orientation of the sensing. Sometimes, this will include a similar number of tags of each of a plurality of frequencies sensed within the time interval, and grouped or formatted to indicate the azimuthal orientation. In other example systems, RFID tags may be used which include tag IDs, facilitating identification of which individual tags have been sensed. As noted above, the information associated with the sensed tags may include MEMS sensor data.

Determining whether sealant (or another fluid in the borehole) is observed in a volume throughout the surrounding annulus consistent with a successful cementing (i.e. sealing can be achieved through use of relatively simple RFID tags. As discussed earlier, similar relatively simple RFID tags responsive to a different frequency may be dispersed into other fluids, so that the progress of multiple fluids in the annulus can be observed.

While these measurements with relatively simple RFID tags are extremely useful, it must be understood that similar techniques are applicable to perform more sophisticated measurements. As described earlier, more sophisticated RFID tags having associated MEMS sensors of various types may be placed within the well servicing fluids. These MEMS sensor tags may include sensors for detecting temperature or any of a variety of fluid properties, etc. These additional properties can be important to fully evaluating the quality of the sealing operation, particularly over time.

For example, monitoring temperature in the annulus can identify regions where the sealant is curing either improperly or inconsistently relative to other areas in the annulus. The ability to identify azimuthal regions where the temperature is inconsistent either with other regions or with expectations can be useful in identifying defects such as fluid incursions. Such temperature sensing MEMS RFID tags may in some cases be active (having a contained power source) or may be passive and energized by the interrogation signal.

Sensed fluid properties may also be of significant use in evaluating the sealing operation. For example, a change in pH in a region of the annulus may also indicate a fluid incursion potentially adversely affecting the sealing operation. As with other measurements, the ability to identify an azimuthal orientation of the sensed parameter provides valuable information facilitating further analysis and/or remediation within the well. Again, in various embodiments these tags may be either active or passive.

Figure 17:
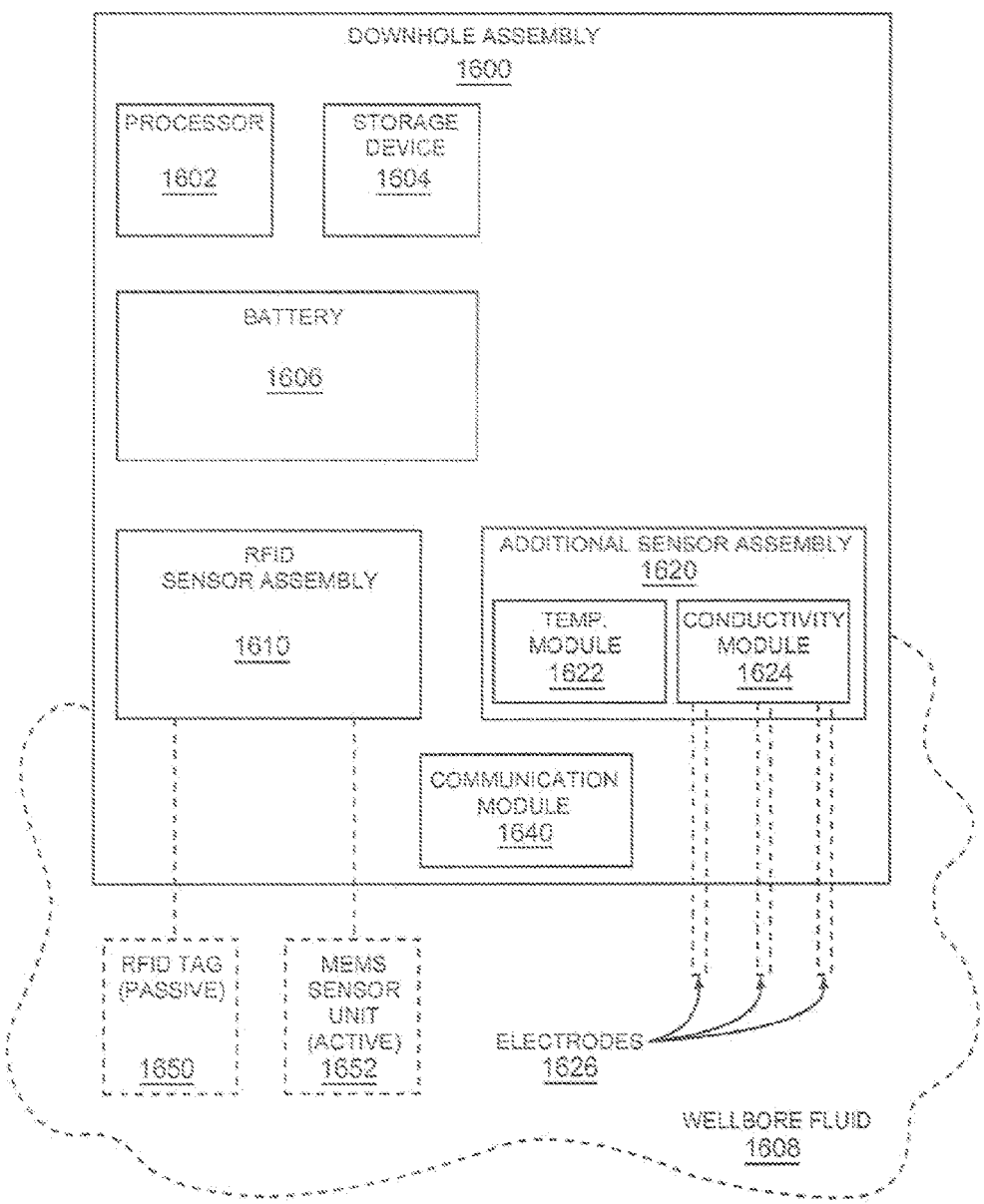
FIG. 17 is one embodiment of an interrogation tool in accordance with the present disclosure.

Turning to FIG. 17, the figure depicts a block diagram of a downhole assembly 1600. Downhole assembly 1600 includes, in various embodiments, any or all of the features, structures, functionality, etc., of communication assemblies and/or sensor assemblies as described above (e.g., communication and/or sensor assemblies described with respect to FIG. 11-14). In various examples the downhole assemblies will be battery operated. As a result, in the absence of provisions for recharging the batteries, once activated, the downhole assemblies will have a finite battery life. The length of this battery life will be influenced by a number of factors, including the sensor assemblies employed; the start, frequency and duration of the sensing performed; and the nature and frequency of communications from (and in some cases to), the downhole assembly, among many other factors. Additionally, some well operations, such as primary cementing of a well, may extend over multiple days, and there may be a need to monitor the downhole conditions of the cement even after the end of the active operations. In some cases, the desirability of such monitoring can extend for multiple days or weeks, and even, to the extent possible, for months or years. Accordingly, management of battery life in the harsh downhole environment can be important.

As shown, downhole assembly 1600 is in contact with wellbore fluid 1608 when the assembly is deployed in a wellbore. This wellbore fluid 1608 may include any wellbore servicing fluid described above, such as drilling mud, spacer fluid, cement or other sealant, etc. Downhole assembly 1600 therefore is configured to be operated while coupled to a casing string in a borehole, and may be mounted on, integrally formed with, or otherwise coupled to an exterior of a portion of a casing string.

Downhole assembly 1600 includes a processor 1602, a storage device 1604, a battery 1606, an RFID sensor assembly 1610, an additional sensor assembly 1620, and an operating mode module 1630 in the embodiment shown. Other structures not depicted in downhole assembly 1600 may also be present in various embodiments, such as power couplings, power transformers/adapters, memories, communication lines, signal lines, and/or other data connections, antennas, receivers, and/or other I/O devices, etc. Each of the described or depicted components of downhole assembly 1600 is coupled to other components of the assembly as necessary to provide the described and inherent functionalities.

Processor 1602 is configured to execute instructions stored on machine-readable storage device 1604. These instructions may cause the downhole assembly, or portions thereof, to perform particular operations as will be described below with reference to this and additional figures. Storage device 1604 may be any suitable storage device, for example, such as a memory device, and may be electronic, magnetic, optical or other storage. Storage device 1604 may also include programmable memory in one embodiment. In another embodiment, instructions in storage device 1604 may be integrated with processor 1602 (e.g., in embodiments in which processor 1602 is an application-specific integrated circuit (ASIC)) in cache memory; or may be integrated into other structures (e.g., RFID sensor assembly 1610, additional sensor assembly 1620, operating mode module 1630 and/o communication module 1640). Additional processors and/or storage devices may also be present in some embodiments, and may be used in conjunction with processor 1602 and/or storage device 1604. In some instances, storage device 1604 may therefore also store instructions operable for use with RFID sensor assembly 1610, additional sensor assembly 1620, operating mode module 1630, and/or other portions of downhole assembly 1600.

Battery 1606 is configured to supply power within downhole assembly 1600, and may correspond to any descriptions of internal batteries discussed above. Accordingly, battery 1606 will provide power to other components within downhole assembly 1600 as necessary. In some embodiments, battery 1606 may be rechargeable from an external source (for example, e.g., through induction). One or more additional batteries may also be present in some cases. Note that more, generally duplicate, or additional structures not shown in FIG. 16 may be present in many systems, as would occur to those skilled in the art having the benefit of this disclosure.

RFID sensor assembly 1610 is configured to interrogate RFID tags in an annulus surrounding a casing string in a borehole in the embodiment shown. As described herein RFID sensor assembly 1610 includes at least one sensor having multiple sensor coils 2100, and may also include any features, structures, functionality, etc., described above with respect to RFID sensor assemblies, or interrogators, in other embodiments described herein.

As shown, RFID sensor assembly 1610 is configured to interrogate and/or receive signals from passive RFID tags such as tag 1650, as well as active RFID tags such as tag 1652. Each of Tags 1650 and 1652 may operate in accordance with the descriptions of active and passive tags provided earlier herein. In most embodiments, downhole assembly 1600 will include a plurality of RFID sensor assemblies, as described above in reference to FIGS. 11 and 13-15.

Additional sensor assembly 1620 is configured to detect information in addition to that detected by RFID sensor assembly 1610. Accordingly, sensor assembly 1620 may include one or more sensors configured to sense any of a variety of parameters of wellbore fluid 1608. In some examples, sensing of temperature in the wellbore fluids will be significant, and additional sensor assembly 1620 will include a temperature module 1622 configured to detect a temperature of wellbore fluid 1608. Additional sensor assembly 1620 may thus include one or more probes (as described in in the preceding section), or other means of sensing the temperature of wellbore fluid 1608. In one embodiment, additional sensor assembly 1620 includes a conductivity module 1624 configured to detect the conductivity of wellbore fluid 1608 through use of a plurality of electrodes 1626. Such a conductivity module will typically provide one or more electrical stimulus signals (which will commonly be AC signals, but which in some cases may be DC signals) into the wellbore fluid, and will detect the signal(s) after the current has passed through the wellbore fluid 1608. In many such conductivity modules, the signal will be sensed at a plurality of distances from the electrode (or other structure) injecting the electrical stimulus signal into the wellbore fluid. In other embodiments, the additional sensor assembly 1620 will include a sensor for monitoring other properties of the wellbore fluid. As just one example, a pH sensing module configured to detect pH values may be provided. In other examples, the additional sensor assembly may include any one or more of: an accelerometer, a tilt sensor, a magnetic sensor, a pressure sensor, an acoustic sensor and an ultrasonic sensor.

Downhole assembly 1600 also includes an operating mode module 1630 in the embodiment shown. Operating mode module 1630 includes circuit logic and/or stored instructions that control operating modes for downhole assembly 1600, RFID sensor assembly 1610, additional sensor assembly 1620, and/or communication module 1640. Thus, operating mode module 1630 is operable to cause all or a portion of downhole assembly 1600 to operate in specific operating modes, for example, by performing periodic sensing operations, detecting triggering events, etc.

Communication module 1640 is configured to facilitate communications with devices external of the downhole assembly. Such communications may be through any of a number of mechanisms, including wireless transmission to the surface, which will typically include wireless communication of signals to one or more other downhole assemblies located relatively uphole, such that the signals are ultimately relayed to a surface location. In another example systems, communication may be through other mechanisms, such as acoustic signaling, etc.

In some cases, sensed information may be communicated to another downhole location, for example another downhole assembly, for further processing prior to communication to a surface location. In addition to the sensors being operated in a plurality of operating modes, communication module 1640 can also be operated in a plurality of modes. For example, during the pumping of cement into the well, just as there is a need for a relatively increased information regarding the placement of the RFID tags (and therefore of the cement containing the tags), there is also a need for that information to be known to the system operator more quickly than at other times. Accordingly, the communication module 1640 will also be in communication with operating mode module 1630 so that the operating mode of communication assembly 1640 can be changed. For example, different operating modes may provide for different intervals at which downhole assembly 1600 communicates sensed data. Multiple operating modes of the communication module are contemplated, as may be specifically defined either in advance of a particular operation, or as may be desirable in view of sensed progress during a given operation.

The above discussion and FIG. 16 identify some components of downhole assembly 1600 as "modules." As used here, such a "module" may be implemented through a variety of structures. For example, a module may include dedicated circuitry or logic that is permanently configured (e.g., within a special-purpose processor, application specific integrated circuit (ASIC), or array) to perform certain operations. Alternatively, a module may also include programmable logic or circuitry (e.g., as encompassed within a general-purpose processor or other programmable processor) that is temporarily configured by software or firmware to perform certain operations. Accordingly, the term "module" should be understood to encompass a tangible entity, however configured or constructed, to operate in a certain manner or to perform certain operations described herein. Considering embodiments in which modules or components are temporarily configured (e.g., programmed), each of the modules or components need not be configured or instantiated at any one instance in time. For example, where the modules or components include a general-purpose processor configured using software, the general-purpose processor may be configured as respective different modules at different times. Software may accordingly configure the processor to constitute a particular module at one instance of time and to constitute a different module at a different instance of time.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, "about" is meant to account for variations due to experimental error. All numerical measurements are understood to be modified by the word "about", whether or not "about" is explicitly recited, unless specifically stated otherwise. Thus, for example, the statement "a distance of 0.01 to 0.4," is understood to mean "a distance of from about 0.01 to about 0.04."

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

The invention claimed is:

1. A method of making measurements in a borehole, comprising:
providing a communication assembly in the borehole, wherein the communication assembly comprises a body member and a plurality of ribs extending from the body member, and the communication assembly is configured to communicate with radio frequency identification device (RFID) tags in the borehole;
wherein the communication assembly includes a sensor assembly at least partially housed within one or more of the ribs and comprising at least one sensor having at least two sensor coils, the sensor coils comprising multiple orientations with respect to each other, and wherein the sensor coils are spaced apart azimuthally around the communication assembly;
pumping a fluid into the borehole, the fluid containing a plurality of RFID tags; and
interrogating the plurality of RFID tags with the communication assembly to determine the presence or absence of RFID tags within the borehole.

2. The method of claim 1, wherein the sensing assembly comprises as least one bandpass filter from $3^{rd}$ to $18^{th}$ order.

3. The method of claim 2, wherein each RFID sensor assembly includes a pair of antennas, and wherein the method further comprises:
transmitting an interrogation signal to the RFID tags from a first antenna of the pair of antennas; and
receiving a response signal from the RFID tags through the second antenna of the pair of antennas.

4. The method of claim 2, wherein each RFID sensor assembly includes a single antenna, and wherein the method further comprises:
transmitting an interrogation signal to the RFID tags from the antenna; and
receiving a response signal from the RFID tags through the antenna.

5. The method of claim 1, wherein each sensor coil is driven independently by its own circuit.

6. The method of claim 1, wherein all sensors are driven by a single circuit.

7. The method of claim 1, wherein the sensor has at least four sensor coils.

8. The method of claim 1, further comprising placing a plurality of communication assembles in longitudinally spaced relation along a casing string in the borehole.

9. The method of claim 1, wherein the fluid comprises a sealant.

10. A communication assembly for use in a borehole with a borehole wall and a casing string, comprising:
- an assembly associated with an annulus formed between the borehole wall and the casing string, the assembly comprising;
  - an RFID sensing assembly configured to communicate interrogation signals to an RFID tag within the annulus and to receive signals from the RFID tag, the RFID sensing assembly including:
    - an antenna arranged around the circumference of the communication assembly and configured to communicate with the RFID tag in the annulus; and
    - at least one sensor comprising at least two sensor coils, the sensor coils comprising multiple orientations with respect to each other, and wherein the sensor coils are spaced apart azimuthally around the communication assembly;
  - a body member; and
  - a plurality of ribs extending generally longitudinally along the body member, wherein at least a portion of the RFID sensing assembly is housed within one or more of the ribs;
- a data storage device to receive information associated with signals received from the RFID tag; and
- a power source configured to supply electrical power to the electronic control circuitry and the data storage device.

11. The communication assembly of claim 10, wherein the sensing assembly comprises as least one seventh order bandpass filter.

12. The communication assembly of claim 10, wherein each sensor coil is configured to be driven independently by its own circuit.

13. The communication assembly of claim 10, wherein all sensors are configured to be driven by a single circuit.

14. The communication assembly of claim 10, wherein the sensor comprises at least four sensor coils.

15. The communication assembly of claim 10, wherein each RFID sensing assembly comprises a single antenna for both transmitting and receiving.

16. The communication assembly of claim 10, wherein each RFID sensing assembly comprises a first antenna configured to transmit an interrogation signal to an RFID tag and a second antenna configured to receive a signal from an RFID tag.

17. The communication assembly of claim 10, wherein the assembly is formed as an integral unit configured to threadably couple into the casing string.

18. The communication assembly of claim 10, wherein the RFID sensor assembly further comprises electronic control circuitry housed within one or more of the ribs.

19. A system for use in a borehole, comprising:
- a casing string comprising first and second communication assemblies supported by the casing string and disposed in longitudinally spaced relation to one another along the casing string,
- RFID tags located in a fluid in an annulus surrounding the casing string when the casing string is in place within the borehole,
- a control unit configured to receive data indicative of the information received from the first and second communication assemblies to provide information about the fluid in the annulus; and
- wherein each communication assembly comprises a body member and a plurality of ribs extending from the body member, and each communication assembly is configured to obtain information associated with RFID tags in an annulus surrounding the casing when the casing is in place within a borehole; and
- wherein each communication assembly comprises a sensor assembly at least partially housed within one or more of the ribs and comprising at least one sensor comprising at least two sensor coils, the sensor coils comprising multiple orientations with respect to each other, and wherein the sensor coils are spaced apart azimuthally around the corresponding communication assembly.

20. The system of claim 19, wherein the sensor comprises at least one seventh order bandpass filter.

* * * * *